(12) United States Patent
Discenzo

(10) Patent No.: US 6,981,423 B1
(45) Date of Patent: Jan. 3, 2006

(54) SYSTEM AND METHOD FOR SENSING TORQUE ON A ROTATING SHAFT

(75) Inventor: Frederick M. Discenzo, Brecksville, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 10/674,967

(22) Filed: Sep. 30, 2003

Related U.S. Application Data

(63) Continuation-in-part of application No. 10/409,894, filed on Apr. 9, 2003.

(60) Provisional application No. 60/371,104, filed on Apr. 9, 2002.

(51) Int. Cl.
*G01L 1/24* (2006.01)

(52) U.S. Cl. .......................................................... 73/800

(58) Field of Classification Search .................. 73/800, 73/862.324, 862.624, 774, 775, 776
See application file for complete search history.

(56) References Cited

U.S. PATENT DOCUMENTS

| | | | |
|---|---|---|---|
| 3,903,738 A | 9/1975 | Makhow | |
| 4,122,709 A | 10/1978 | Brown et al. | |
| 5,705,810 A | 1/1998 | Wang et al. | |
| 5,723,794 A * | 3/1998 | Discenzo | 73/800 |
| 5,969,269 A | 10/1999 | Munyon | |
| 6,055,053 A * | 4/2000 | Lesniak | 73/800 |
| 6,513,390 B1 * | 2/2003 | De La Puente et al. | 73/800 |
| 2002/0079156 A1 | 6/2002 | Nizers | |
| 2003/0132054 A1 | 7/2003 | Gillman, et al. | |

* cited by examiner

*Primary Examiner*—Max Noori
(74) *Attorney, Agent, or Firm*—Amin & Turocy LLP; R. Scott Speroff

(57) ABSTRACT

A system and method relating to the measuring of torque in a rotating shaft is provided. An optical torque sensing system comprises a rotating shaft, wherein a sleeve of photo-elastic material overlays a portion of the shaft. A light emitting component delivers light into the photo-elastic material, wherein the light delivered by the light emitting component is directed through the photo-elastic material along an axis of the rotating shaft. A capturing component captures the light that exits the photo-elastic material. The exiting light comprises fringe pattern data, and a computing system computes torsion strain of the shaft based at least in part on the fringe pattern information.

27 Claims, 26 Drawing Sheets

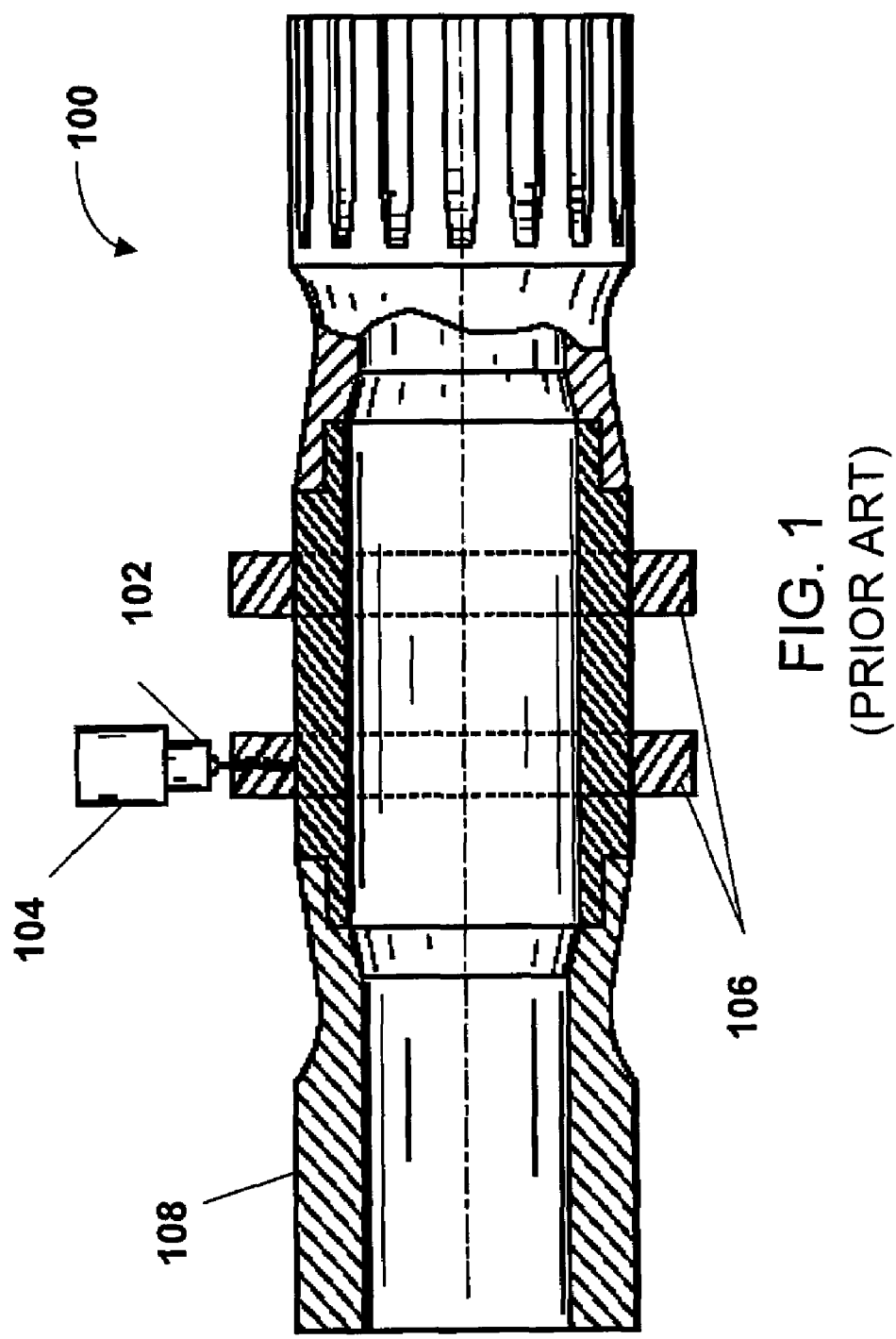

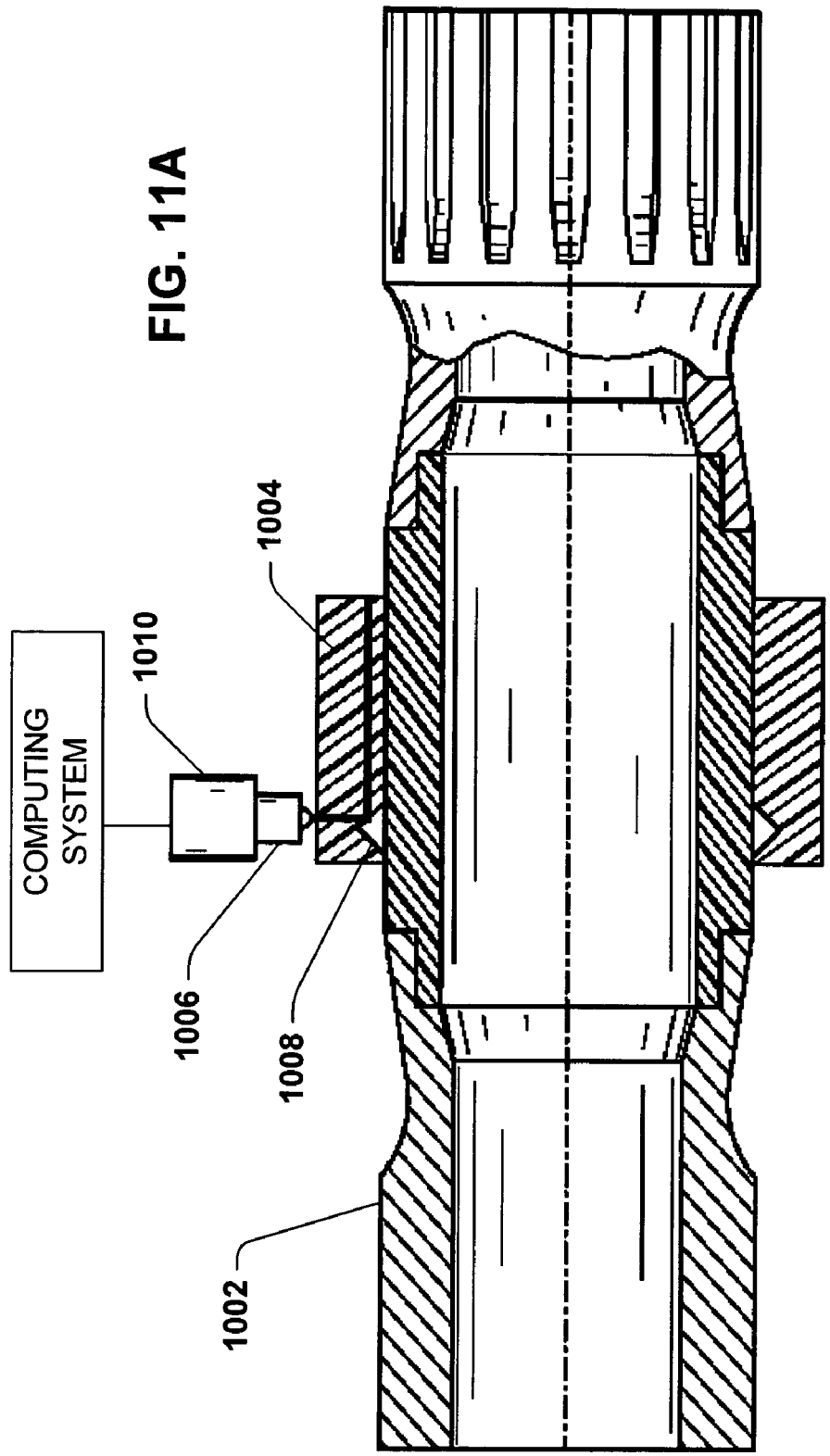

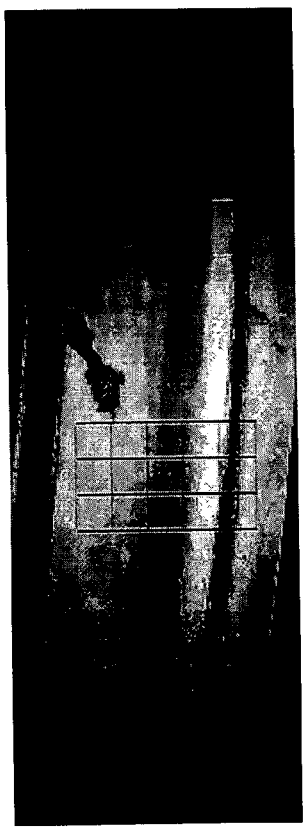
FIG. 14D
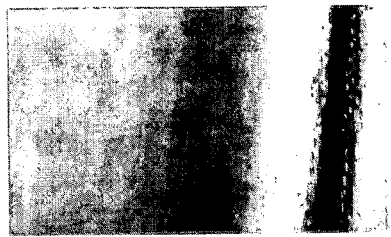
15820 in-lb
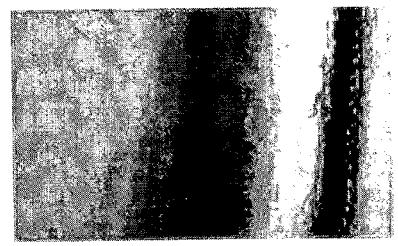
7910 in-lb
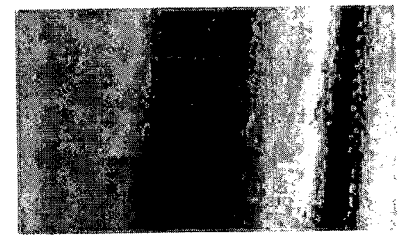
1318 in-lb
FIG. 14E

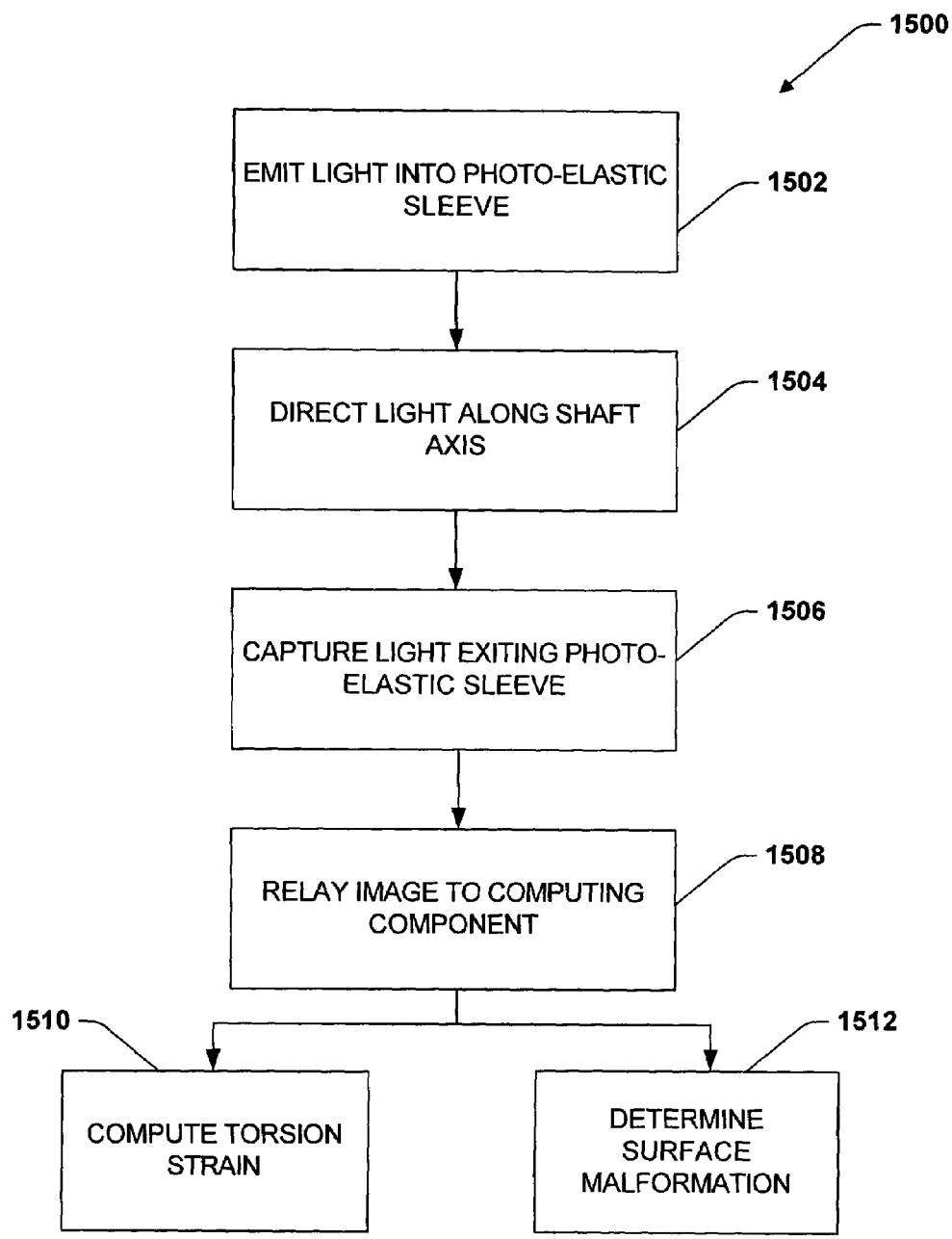

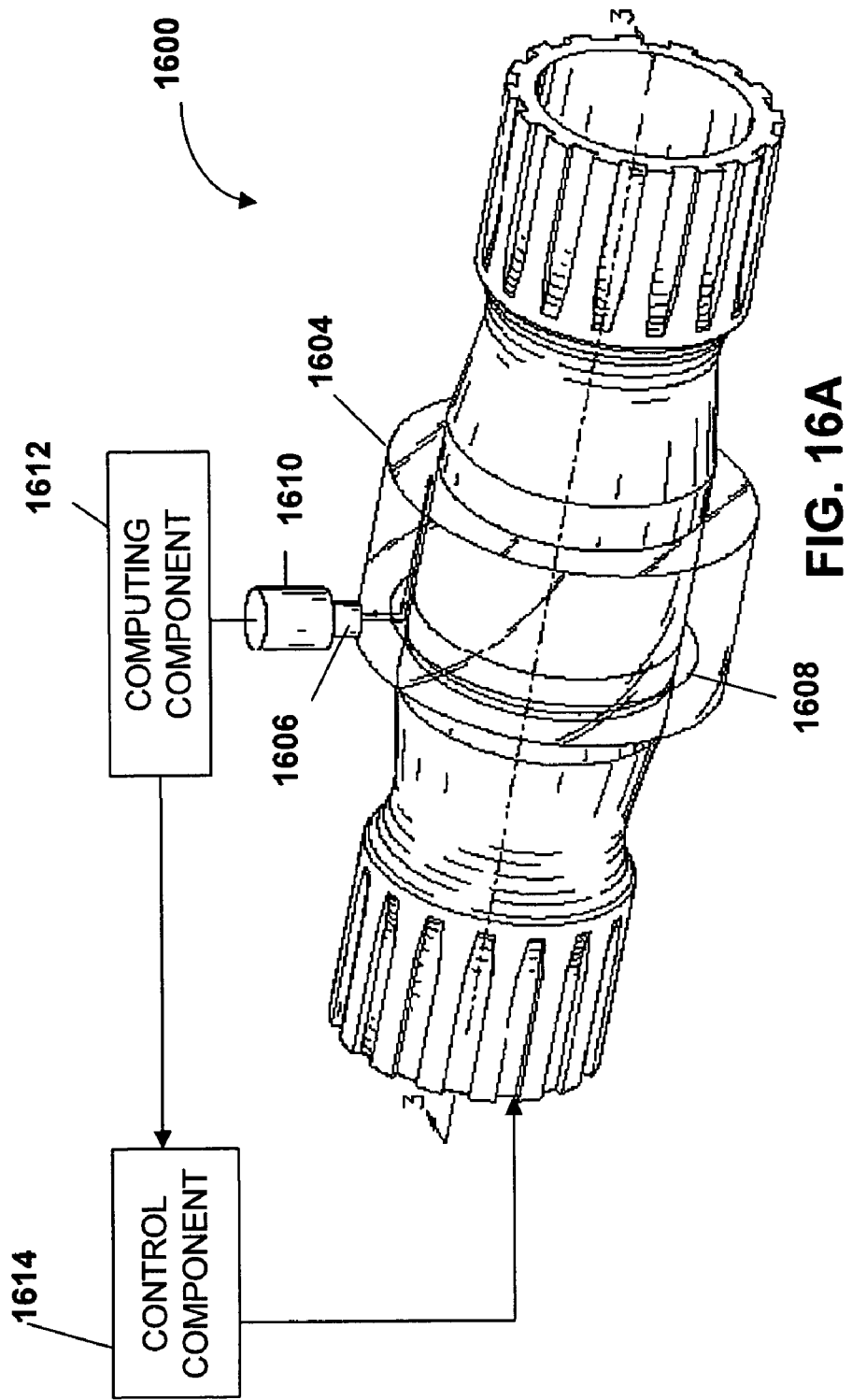

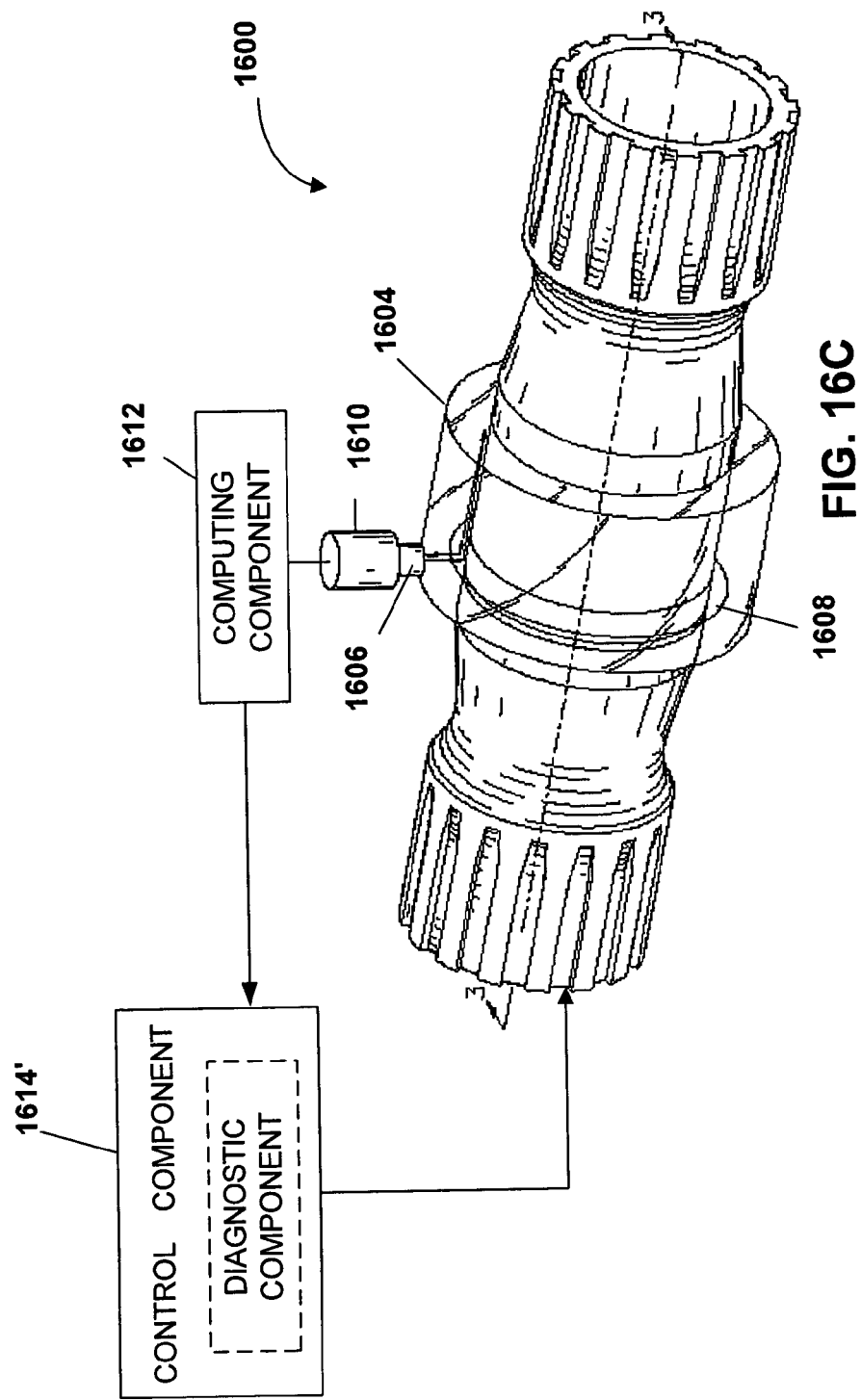

SYSTEM AND METHOD FOR SENSING TORQUE ON A ROTATING SHAFT

CROSS-REFERENCE TO RELATED APPLICATIONS

This application is a continuation in part of U.S. Ser. No. 10/409,894 entitled System and Method for Sensing Torque on a Rotating Shaft, filed on Apr. 9, 2003, which claims the benefit of U.S. Provisional Application Ser. No. 60/371,104 entitled Systems and Methodologies for Enhancing Machine Reliability, filed on Apr. 9, 2002—the entirety of these applications are incorporated herein by reference.

TECHNICAL FIELD

The present invention generally relates to optical sensors employed in conjunction with sensing a photo-elastic effect. In particular, the present invention relates to a system and method for obtaining and analyzing data regarding dynamic, moving structures and static, non-moving devices and components via an optical sensor.

BACKGROUND OF THE INVENTION

Sensors can be found everywhere in today's society—heat sensors are utilized in a common thermostat to activate/deactivate heating and cooling units. Light sensors can be used to govern when to turn on and off automobile headlights (e.g., if the sensor does not receive a predetermined minimum amount of light, a control unit will activate headlights). Even an alarm clock can be thought of as a time sensor, wherein upon sensing a preset time a signal is output from the clock. Dynamic sensing of torque and strain in a rotating shaft would be beneficial towards improving design and analysis of machinery, as well as allowing for torque and strain of a rotating shaft to be utilized as a control parameter in a control system(s). Dynamic torque information also provides an important capability to perform real-time diagnostics for rotating machinery and diagnose mechanical faults thereby predicting and mitigating catastrophic failure. Rotating machinery is prevalent in virtually every manufacturing facility. It is not uncommon for a facility to have hundreds or even thousands of rotating machines. Commercial systems including HVAC systems, vehicles, aircraft, and ships also depend on a large number of rotating machines working reliably. Information related to a rotating system is important for control, such as in dynamometer test stands and many manufacturing processes. Furthermore, such information is important to avoid unexpected or hazardous operating conditions and catastrophic failure. Similarly, it is desirable to determine lateral and angular strain (e.g., torque) for non-rotating shafts. For example, a vehicle steering system can benefit from determining steering wheel torque applied by a driver, strain on steering linkage components, and dynamic wheel torque experienced by wheels on the road. Robust, affordable, lightweight sensing systems for obtaining data regarding a moving or rotating shaft (specifically torque), however, are presently non-existent.

Rotating shafts driving a load are susceptible to torsional strain. Continuous strain on the shaft will eventually result in machine inefficiency and/or shaft deformation and/or breakage (e.g., shaft cracking). Dynamic torque (strain) fluctuations can cause mechanical and fatigue damage as well as accelerate machine failure. A sensor used to measure torsional strain (torque) on a shaft can therefore be desirable. However, conventional torque sensors are large, costly, heavy, failure prone, and provide limited dynamic signal (bandwidth). For example, a conventional torque sensing system can weigh approximately 1500 pounds if one desired to measure torque found in a tail rotor of a helicopter. According to another prior art technique, a shaft can be instrumented with strain gauges and thus, establish power and signal coupling to the rotating shaft. However, providing suitable signal amplification and signal analysis is also impractical due to size, weight, reliability, cost, and performance factors. Furthermore, the conventional shaft torque sensing system in the example above would cost at least five thousand dollars, be susceptible to failure due to shock loads, and take up valuable aircraft space and payload capacity. Conventional sensing systems that consider angular displacement difference between two ends of a rotating shaft typically involve costly and complex optics and mechanical interconnect equipment.

Additionally, rotating shafts are prone to misalignment when two or more shafts are employed and coupled together. For example, misalignment between a motor shaft and a pump shaft is a significant and prevalent cause of premature bearing and seal failure, which often cause motor failures and motor-pump system failures. Misalignment can also cause accelerated wear on couplings, mountings, piping, and increased heating and energy loss. Conventional systems typically align coupled shafts utilizing mechanical gauges and shims; however, these techniques are not precise. Alternative techniques employ laser alignment, but these systems are typically costly, time consuming, and are only performed while the machinery is not operating. Effects such as thermal expansion and dynamic shaft loading due to mechanical or magnetic fields can cause a system aligned while at rest to become misaligned when functioning at operating temperatures with loads.

Prior art methods can also have a limited ability to verify the integrity of composite joints. Composite materials are being utilized in an increasing number of structures (e.g., aircrafts). For example, shafts constructed from composite material can be employed to carry power from a main engine to a tail rotor in a helicopter. Prior art techniques (e.g., acoustic, IR) are difficult, costly and time consuming.

Using a property of photo-elasticity in conjunction with optical sensors to measure torque on a rotating shaft is one prior art method to mitigate disadvantages of conventional torque measuring systems. Optical sensing systems are desirable because they are compact and lightweight in comparison to conventional electric or magnetic sensors, and have significantly greater immunity to electromagnetic interference as compared to many conventional systems. Furthermore, optical sensing systems can be produced inexpensively and allow for quick replacement/repair of the system. Lastly, optical sensing systems can provide high frequency torque signals unobtainable with conventional torque sensor(s).

The property of photo-elasticity has been used to measure strain on materials for over fifty years. The method of determining strain relies on the birefringence property exhibited by transparent glasses and plastics (e.g., polarized light waves exhibit a phase and angle shift when traversing through photo-elastic material under deformation). In particular, the phenomenon of load-induced birefringence is utilized where a material exhibits birefringence under deformation caused by external loading. In practice, polarized light is delivered into a photo-elastic material wherein a strain in the photo-elastic material is encountered. The normally incident polarized light is shifted in phase and angle along the principal strain directions as it propagates through a photo-elastic material. The velocities of light transmission along these directions are directly proportional to magnitude of respective principal strains. The light is then passed through a second polarizer or an analyzer, which resolves the rotated beams into a light-intensity pattern the strain on the material can be deduced by inspection of the resulting light-intensity pattern.

FIG. 1 illustrates an exemplary cross-sectional view of a prior art optical sensing system 100 which can be employed to measure torque on a rotating shaft. The sensing system 100 includes a light emitting component 102, a capturing component 104, and strips of photo-elastic material 106. The strips of photo-elastic material 106 encircle a rotating shaft 108, and interiors of the strips of photo-elastic material 106 are coated with a reflective substance such as an aluminum filled epoxy. Two strips of photo-elastic material 106 are depicted in FIG. 1 for purposes of demonstration; however, any number of strips can be employed. In operation, the light emitting component 102 releases a beam of light into a strip of photo-elastic material 106. The light reflects off of a reflective interior surface of the strip of the photo-elastic material 106, and back out through the photo-elastic material radially and into the capturing component 104. A light-intensity pattern is visible from the light exiting the strips of photo-elastic material 106. The light-intensity pattern is a spectrum of colors known in the art as a fringe pattern, wherein each fringe is comprised of a band of colors. The number of fringes, narrowness and proximity of the fringes in the fringe pattern indicate the amount of phase retardation of the transmitted beam of light and therefore, strain experienced in the photo-elastic material. This provides a measure of the amount of strain on the rotating shaft 108. Data acquisition equipment, signal processing, and pattern recognition software (not shown) are employed to determine a quantitative, accurate measure of the angular strain or torque on the shaft. The photo-elastic strip 106 is intended to encircle the rotating shaft and be axisymmetric. By imaging the photo-elastic strip at the same location or and different locations on the strip, a dynamic measure of the torque on the shaft may be obtained as the shaft rotates.

The subject invention as described below provides for significant improvements over the aforementioned prior art systems and addresses unmet needs with respect to the amount of shaft data desired in connection with rotating shafts. In particular, the prior art systems and methods fail to establish whether rotating shafts are in alignment and the degree of misalignment, and further lack the ability to perform dynamical alignment. Additionally, there is a need for improved techniques to monitor shaft cracking and verify composite joint integrity.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for an optical sensing system that facilitates measuring one or more characteristics of a structure (e.g., shaft) and gathers significantly more data than the aforementioned prior art systems, and accordingly provides a more comprehensive analysis with respect to structural analysis. Light emitted from a light source is directed through a photo-elastic material in an axial direction and/or radial direction along a rotating shaft, thus allowing for a greater amount of coverage area from which the sensor can detect structural fatigue, torsional load, or misalignment, for example. The optical sensing system of the subject invention can also be utilized for high-frequency load sensing, lateral load sensing, axial load sensing, and surface monitoring as well as measuring rotational speed, displacement, acceleration, vibration, temperature, stress, and so forth. Through use of external analysis, storage, and/or display components, properties of the shaft or other portions of a machine (e.g., fatigue, cracking, breakage, misalignment . . . ) can be dynamically determined.

Based upon the above determinations, various systems and processes can be provided. These include optical torque and joint integrity applications, dynamic sensing to predict shaft cracking and/or breakage, automatic misalignment, severity detection, and/or associated dynamic correction for rotating machinery applications. Other applications include motor alignment, mounting integrity, and seal analysis via bi-refringent optical coupling, for example. Still other applications include load sensing for vehicle steering and drive train components. For example, integrated intelligent steering systems can be utilized to enable highly responsive, reliable, and safe steering on various rough and slippery surfaces by sensing driver commanded torque and wheel/steering loading. Such systems can be employed in a closed-loop steer-by-wire system.

Thus, the present invention provides flexible and robust systems and methods for determining a plurality of characteristics for rotating machinery while facilitating various automatic correction procedures relating thereto.

In accordance with one aspect of the present invention, a portion of a rotating shaft is encompassed by a sleeve of photo-elastic material, wherein the photo-elastic sleeve is attached to the shaft. For example, the photo-elastic sleeve can be cast, machined, attached with adhesive, or even sprayed onto the shaft. A light source is employed to deliver light that will travel along the axis of the shaft through the photo-elastic sleeve. The light source can be placed at any suitable angle to the rotating shaft, so long as the light delivered is redirected through the photo-elastic sleeve along the axis of the shaft. For instance, a light source can be configured to deliver light perpendicularly to the shaft into the photo-elastic sleeve, wherein the light is redirected by a reflective notch (e.g., v-groove) cut at an angle (e.g., 45°) to the light source, thereby redirecting the light along the axis of the shaft. V-groove faces can optionally be covered with a thin strip of reflective material (e.g., Mylar™) to provide a specular surface with minimal light distortion. At least one end of the collar of the photo-elastic material can be coated with a reflective substance (e.g., aluminum filled epoxy), thus requiring a beam of light emitted from a light source to reflect back along the same path. For example, having a beam of light traverse a longer path through the photo-elastic material such as twice the axial length (e.g., once prior to reaching the reflective edge and once upon reflection) results in a more accurate and thorough analysis of mechanical wear of the shaft.

The light exiting the photo-elastic material produces a fringe pattern, wherein areas of narrow, grouped fringes can be indicative of areas of strain concentration. When a beam of light travels through a photo-elastic material, the index of refraction of the light is altered as a function of difference in principal strains. When viewed through polarizing filters, the light returning exiting the photo-elastic material exhibits a fringe pattern which is a function of material strain, wavelength of light, material thickness, and material strain-optic coefficient. A capturing device utilizing polarizing filters, such as for example a digital camera or an optical sensing chip (e.g., CCD array) can be employed to capture the fringe pattern exiting the photo-elastic material. The strain of the photo-elastic material, and thus a plurality of mechanical wear and/or alignment factors on the rotating shaft can then be determined by interpreting the resultant fringe pattern. Techniques such as image processing, feature extraction, artificial neural networks, and pattern recognition techniques can be employed to establish a quantitative measure of deformation or torsional strain on the photo-elastic material and the structure, device, or component to which it is mounted. Using established mechanical relationships, a precise measure of the torque, strain, and material stress can be obtained.

Since a number of fringes increases linearly with optical path length, sensitivity of the optical sensing system is also increased as a function of length of the photo-elastic material. In the prior art, by restricting the light direction to be only radial, the path length of the beam was limited to two times the thickness of the photo-elastic collar. However, it is desirable to keep the collar relatively thin to avoid problems with collar mounting, minimize vibration, minimize forces during rotation, and avoid optical distortion from thick materials. Additionally, it is to be understood that a reflective substance on a collar of the photo-elastic sleeve is not required to practice the invention, as strain on the shaft can be determined when a beam of light passes through an end photo-elastic sleeve and data collected at such end as compared to the light reflecting backward from such end.

The subject invention can be implemented with any rotating shaft that may incur strain from driving a load. For example, the invention could be employed to determine the torque and strain on a turbine drive shaft, a drive shaft on a truck or automobile, vehicle steering components, a shaft driving a helicopter blade, helicopter gearbox, etc. The invention can also be coupled to a control system, thereby protecting the shaft from failure due to misalignment, early signs of breakage and/or other destructive forces. A control system can also be employed in connection with the present invention to control operation of the shaft by utilizing one or more parameters that can be sensed by the sensor (e.g., fatigue, cracking, breakage, rate of degradation, amount of degradation and misalignment). For example, this provides an effective method for preventative maintenance and such information can be utilized in connection with a diagnostic system, wherein upon detection by the diagnostic system, an operator can be informed that repair or replacement of the shaft is necessary. As another example, if analysis of the dynamic torque signal from the sensor indicates a weakened component, the control system can limit the control gains or stress levels on the rotating shaft to slow down or prevent any further degradation of the rotating shaft. According to a further example, if a weakened shaft or coupling is detected in a rotorcraft application, then the maximum pitch or pitch rate change can be reduced in non-emergency situations to prolong the life of the mechanical components and potentially avoid a mechanical failure while the rotorcraft is airborne. Additionally, a dynamic signal determined by the invention can provide high bandwidth torque fluctuation information. The sensed torque signal can be analyzed in the frequency domain (e.g., taking an FFT of the sampled torque signal) or joint time-frequency domain (e.g., windowed-FFT or wavelet transform) to establish a comprehensive health assessment of the rotating shaft and components mechanically coupled to the shaft such as bearings, couplings, gearboxes, aircraft actuators, and pumps. Faults with bearings in connected machinery, such as a gearbox, can be detected by analyzing the high frequency torque signal produced by the photo-elastic torque sensor. In another aspect of the subject invention, the optical measurement system can be employed to detect imminent structural breakdown resulting from mechanical wear of the shaft. Fatigue, cracking, and other early signs of breakage can be determined and steps taken to prevent such a failure from occurring. Detection of such a breakdown is important in applications where the shaft is a critical component to a system, such as a shaft used to deliver power to the tail rotor of a helicopter.

In yet another aspect of the present invention, an imminent failure condition can be relieved by employing a feedback control system wherein a corrective measure is made without human interaction. For example, if a rotating shaft is misaligned along its axis, a smart material can be employed at either end to re-align the shaft and place it within desired operating parameters. Thus, a lateral or axial misalignment can be corrected by employing a closed-loop control system. Feedback from an alignment sensor can confirm that the shaft is aligned and can facilitate subsequent control actions required to maintain alignment in the event of thermal deformation, wear, or loading changes.

To the accomplishment of the foregoing and related ends, the invention then comprises the features hereinafter fully described and particularly pointed out in the claims. The following description and the annexed drawings set forth in detail certain illustrative aspects of the invention. These aspects are indicative however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 1 is a diagram of an optical torque sensor of the prior art.

FIG. 11A is a cross-sectional diagram of the exemplary optical torque sensor of FIG. 10 in accordance with an aspect of the present invention.

FIG. 14D illustrates analyzing a set of image cells in accordance with the subject invention.

FIG. 14E illustrates several exemplary grey scale fringe patterns corresponding to varying shaft torques in accordance with the subject invention.

FIG. 15 is a flow diagram of a method that facilitates the sensing of torsion strain on rotating shaft in accordance with an aspect of the present invention.

FIGS. 16A–16C illustrate exemplary optical torque sensor(s) used in conjunction with a control system in accordance with an aspect of the present invention.

DETAILED DESCRIPTION OF THE INVENTION

Figure 2A:
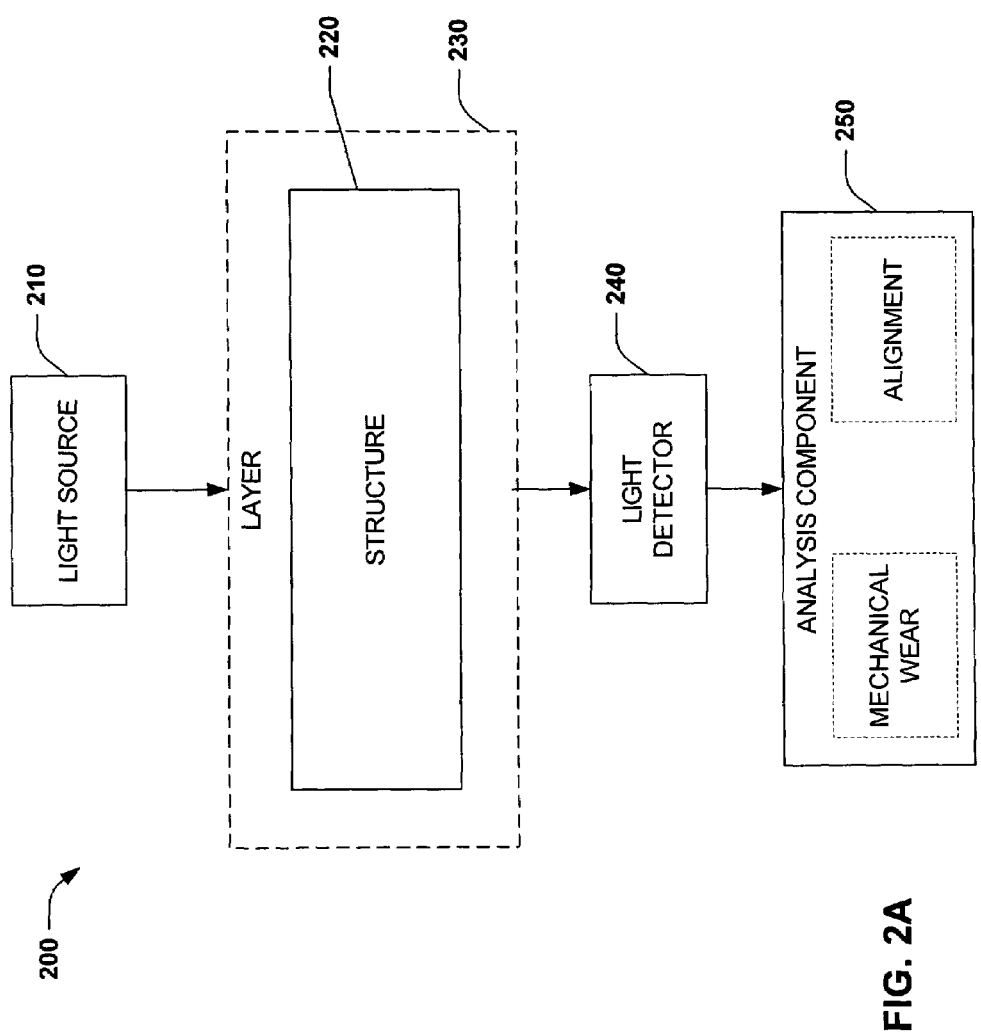
FIG. 2A is a system that determines one or more characteristics of a structure in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" or "system" are intended to refer to a computer-related entity, either hardware, a combination of hardware and software, software, or software in execution. For example, a computer component can be (but is not limited to) a process running on a processor, a processor, an object, an executable, a thread of execution, a program, and/or a computer. By way of illustration, both an application running on a server and the server can be a computer component. One or more computer components may reside within a process and/or thread of execution and a component can be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

FIG. 2A illustrates a system 200 that determines one or more characteristics of a structure, in accordance with an aspect of the present invention. The system 200 comprises a light source 210 that emits a light which interacts with a structure 220 substantially surrounded by a layer 230, wherein the layer 230 can facilitate obtaining characteristics indicative of the structure 220 via light received by a light detector 240 and an analysis component 250. The structure 220 can be any known material where it is desirable to obtain characteristics. For example, in one aspect of the present invention, the structure 220 can be a shaft, a coupler, a composite joint, a bracket, a steering tie rod, gear, tire tread, bridge structure, etc. Examples of characteristics that typically are monitored and analyzed for such structures include fatigue, cracking breakage, rate of degradation, corrosion, amount of degradation, misalignment, and the like.

The layer 230 typically is constructed from a photo-elastic material such as polycarbonate. However, it is to be appreciated that various other materials can be employed in accordance with an aspect of the present invention, such as, for example glasses and acrylics. The layer 230 can be formed at the surface of the structure 220 via a gap. The gap can be, for example, air, any number of disparate layers, etc. Alternatively, a gap may not be formed between the layer 230 and the surface of the structure 220.

Figure 2B:
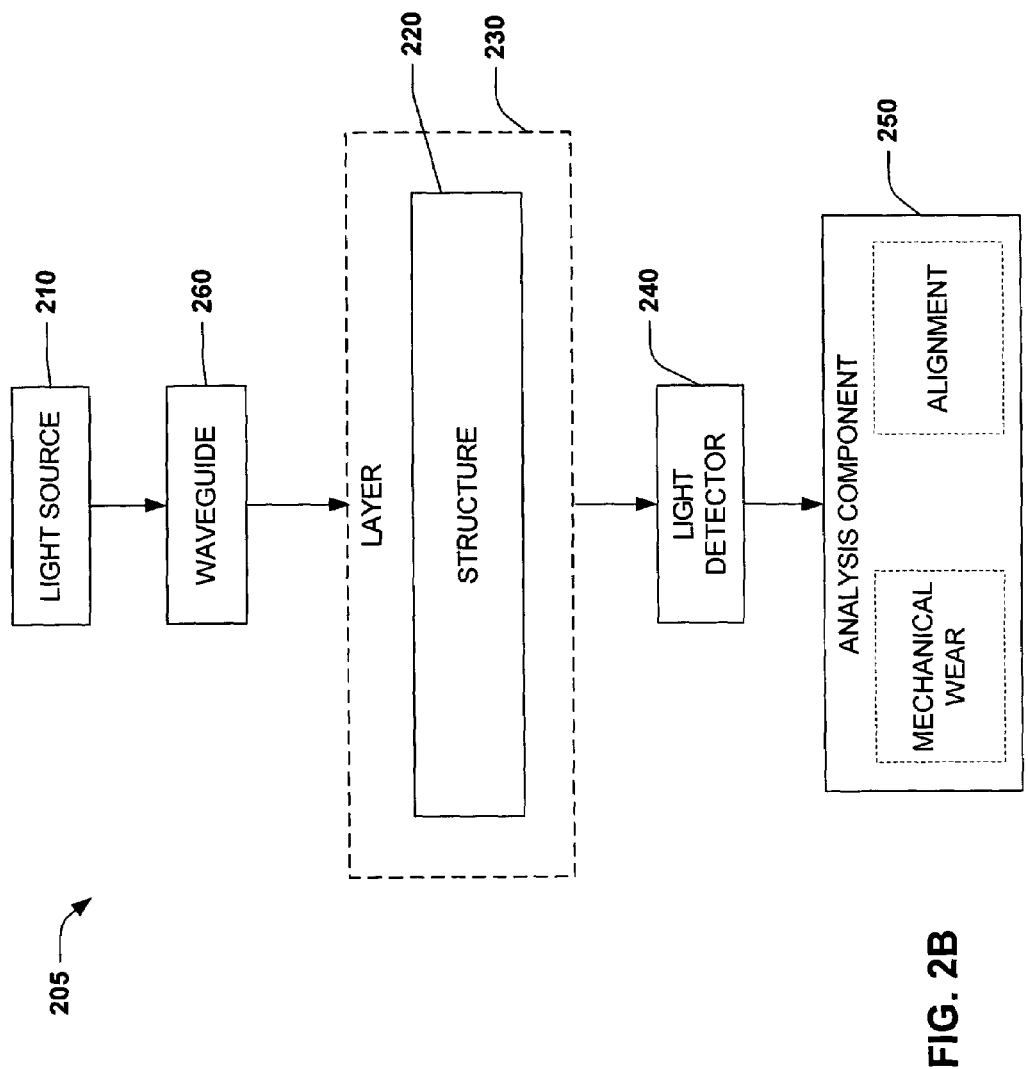
FIG. 2B is a system that determines one or more characteristics of a structure in accordance with an aspect of the present invention.

Moreover, a gap can exist between the light source 210 and the layer 230. The light source can be close coupled and directly contacting layer 230. Alternatively, the light source can transmit light through air to layer 230 as in a free space optical interconnect. Alternatively, as depicted in system 205 in FIG. 2B, the light source 210 can be separated from layer 230 such that the transmitted light is directed to the layer 230 utilizing an optical waveguide 260. The optical waveguide 260 can be, for example, a fiber optical cable.

Referring again to FIG. 2A, it is to be appreciated that the light source 210 can emit substantially any non-contact source such as electromagnetic, RF and/or an IR signal.

Generally, the received light can propagate within the layer 230. That is, layer 230 is capable of transmitting the light or electromagnetic energy emitted by the light source 210. For example, the light source 210 can traverse longitudinally across the layer 230. Once the light reaches the end of the layer 230, it can be collected by the light detector 240 and analyzed and/or reflected back through the layer 230. In another example, the input can be introduced at an angle (e.g., acute and obtuse) incident the layer 230. The input can reflect and/or refract to facilitate a propagation path through the layer 230.

In one aspect of the invention, more than one input is received by the layer 230. In one instance, the more than one input can combine to change the profile of the input. For example, the combination (e.g., constructive and destructive interference) can render a different energy, wavelength, frequency and/or phase. In another instance, the more than one input can be introduced in a delayed manner. Thus, multiple inputs can be utilized to determine characteristics of one region of a rotating shaft over time, an entire section of a rotating shaft over time, etc.

By way of example, light can be introduced into the photo-elastic layer 230. The light can be introduced into the layer 230 at an angle perpendicular to the surface of the structure 220, parallel to the surface of the structure 220, or any other angle. The light primarily propagates through the photo-elastic layer 230 in a direction substantially parallel to the surface of the structure 220. Upon reaching an edge of the layer 230, the light can either exit out of the layer 230 or be reflected through the layer 230 in the direction opposite the initial propagation and then exit the layer 230.

Upon exiting the layer 230, the light is received by the light detector 240. Similar to the gap between the light source 210 and the layer 230 as discussed supra, light transmitted from layer 230 to the light detector 240 can utilize a free space optical interconnect, the light can travel through air, or the light can be transmitted from the layer 230 to the light detector 240 employing a waveguide, such as a fiber optical cable (e.g., glass or plastic). The received light can be analyzed by the analysis component 250. Measurable properties (e.g., number of fringes, narrowness, and proximity of fringes in the fringe pattern, pattern or observed fringes) of the received light are indicative of characteristics of the structure 220. Since the light travels parallel to the direction of the surface of the structure 220, a full inspection of the structure 220 in the section covered by the layer 230 is facilitated. The analysis component 250 can be utilized to determine the condition of the structure, such as mechanical wear and alignment, wherein proactive remedial measures are provided. For example, a rotating shaft can exhibit characteristics of structural degradation (e.g., fatigue, cracking and the like) such that the analysis component can provide an alert that such a condition should be alleviated. In another aspect of the subject invention, a lateral misalignment of the shaft can be detected and remedied via a closed loop control system to re-align the shaft and provide for proper functionality which is described in more detail below.

Figure 3:
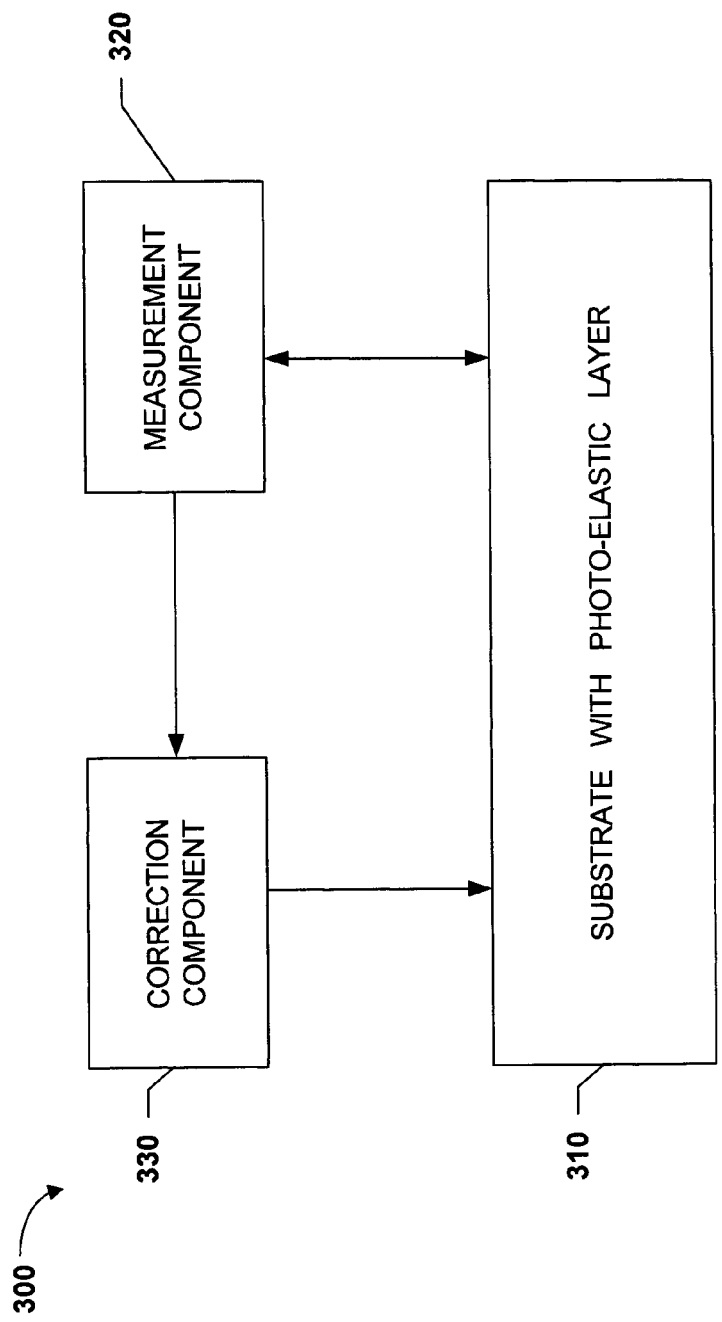
FIG. 3 is a system that measures and corrects characteristics in accordance with an aspect of the present invention.

FIG. 3 illustrates a system 300 in accordance with an aspect of the present invention. The system 300 comprises a substrate 310 (e.g., a shaft, coupler, composite joint, . . . ) with a layer of photo-elastic material formed proximate, wherein the layer forms a sleeve. A measurement component 320 can interact with the photo-elastic material to measure characteristics of the substrate 310. For example, the measurement component 320 can transmit energy (e.g., light) into the photo-elastic layer formed proximate to the substrate 310. The photo-elastic layer is subject to similar torques, strains, stresses, etc. which are encountered by the substrate included in 310. In response to the transmitted energy, a fringe pattern indicative of a torque, a strain, etc. existent within the photo-elastic layer is created. Returned energy can be received by the measurement component 320 and analyzed to determine characteristics of the substrate 310. In particular, the torque, strain, stress, lateral misalignment between shafts, radial misalignment between shafts, etc. can be measured, wherein automated analysis can proceed and subsequent procedures initiated.

The measurement component 320 can further utilize motor current from the operation of an AC synchronous motor. The motor current provides data whether misalignment exists within the motor system. Utilizing several phases of motor current in addition to the optical measurements increases the accuracy of quantitative misalignment measurements.

The system 300 further comprises a correction component 330. The correction component 330 employs the characteristics determined by the measurement component 320 and thus, facilitates modification of parameters of the substrate 310 based at least in part on the measurements. For example, the correction component 330 can utilize the ability of the measurement component 320 to establish misalignment to alter the radial position of a bearing in response to the sensed misalignment. Such alterations of radial bearing positions can be accomplished by utilizing a mounting in each end bracket of a standard AC motor comprised of smart materials such as, for example, Sharp Memory Alloys (e.g., Nitinol), piezoelectric ceramics, electroactive polymers (e.g., IPMC metal composite structures), etc. These materials are advantageous to employ as bearing displacement actuators in end brackets because of their properties. In particular, they provide actuator energy density, clean operation, safe spark-free operation, and smooth control actuation. It is to be appreciated that more conventional actuators can also be employed in connection with this invention. Controlling radial location of the bearings independently can reduce and/or eliminate lateral and/or angular misalignment.

Figure 4:
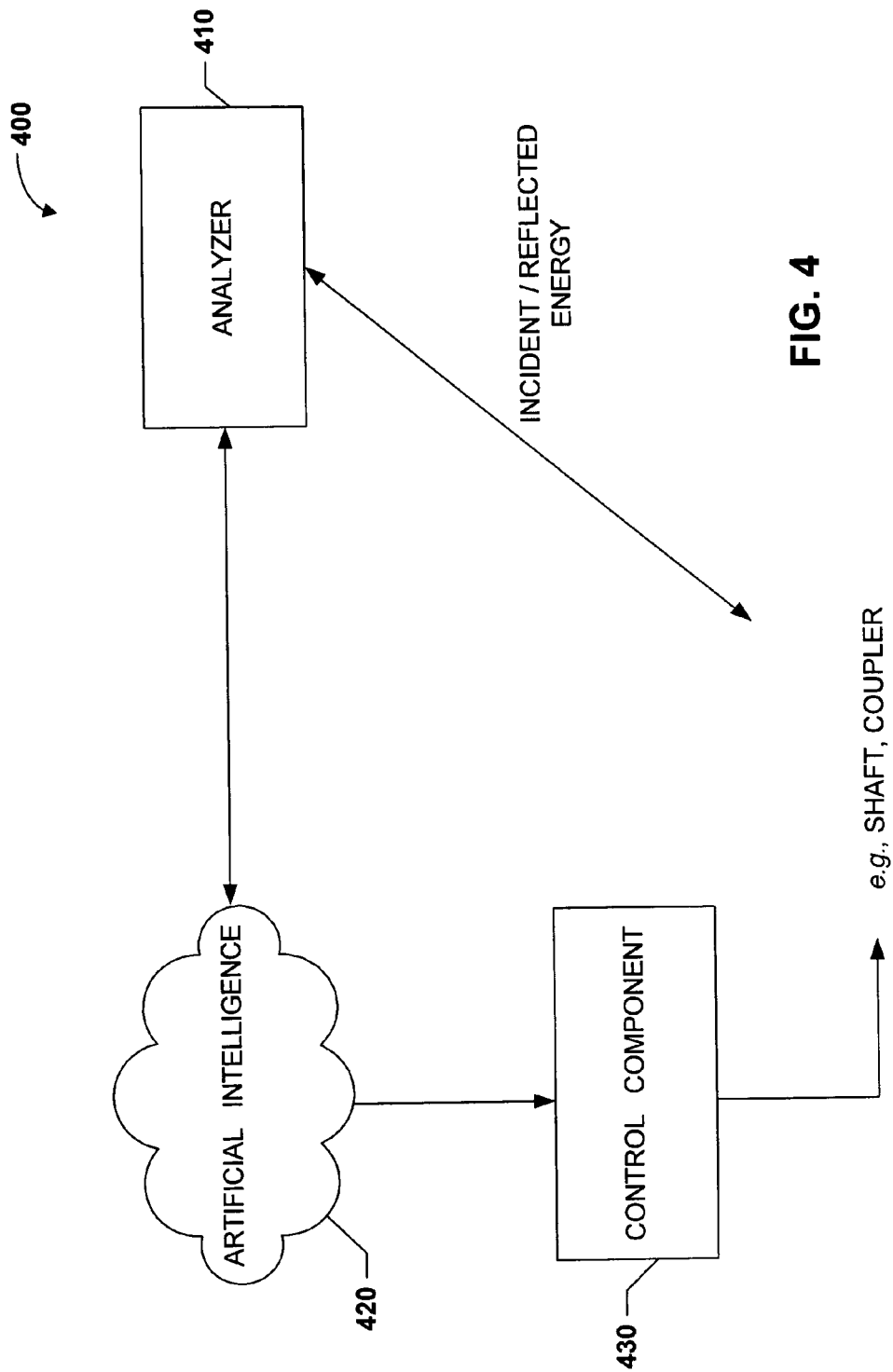
FIG. 4 is a system for analyzing characteristics in accordance with an aspect of the present invention.

In accordance with another aspect of the present invention, FIG. 4 illustrates a system 400 for analyzing characteristics within an environment comprising a rotating shaft. The system 400 comprises an analyzer 410 which transmits and receives energy which can travel through various material, such as a photo-elastic material. For example, a photo-elastic material can be formed around a medium that is to be inspected, such as a shaft that rotates. When the shaft experiences torque, strain, etc., the received light will contain a corresponding fringe pattern indicative of such characteristics.

An artificial intelligence (AI) component 420 can be utilized by the analyzer 410 to determine characteristics (e.g., torque, strain, misalignment, joint integrity, . . . ) of the medium to be inspected. The artificial intelligence component 420 can employ any of a variety of suitable classification schemes and/or systems (e.g., support vector machines, neural networks, expert systems, Bayesian belief networks, Hidden Markov Models, fuzzy logic, data fusion engines, non-linear training systems, frequency analysis, wavelet, non-linear dynamics, . . . ) in connection with the subject invention. The AI component 420 can include seed classifiers that have been explicitly trained as well as classifiers that are implicitly trained. The AI component 420 can facilitate diagnosing current states of the inspected medium.

The AI component 420 can further facilitate a control component 430 to respond to the current state of characteristics of the inspected medium. For example, if the AI component 420 determines that a shaft is misaligned, the control component 430 can effectuate alteration of the radial position of a bearing utilizing a smart material-based mounting in end brackets of standard AC motors. According to another example, if early signs of breakage of a shaft are detected, the control component 430 can effectuate switching the power to a rotating shaft off to mitigate a catastrophic event such as, for example, shaft material cracking radially, shaft material shearing off the shaft, and/or the shaft splitting axially. According to a further example, based on operating requirements of a rotorcraft in flight, the control component 430 can limit the maximum stress delivered to a weakened component to avoid a catastrophic failure while continuing reliable flight operations which, although slower, less efficient, or at a lower altitude, insure a safe return or safe landing of the rotorcraft.

Figure 5:
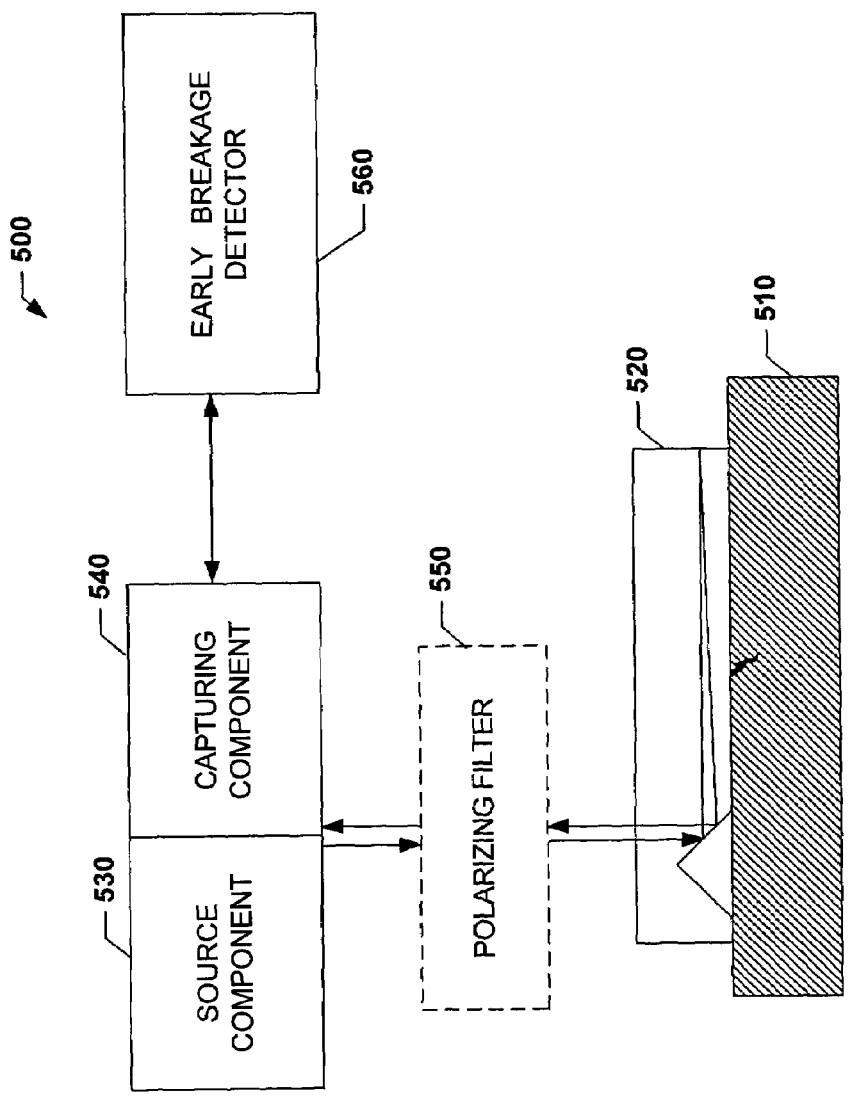
FIG. 5 is an optical defect sensor system in accordance with an aspect of the present invention.

Referring now to FIG. 5, an optical defect sensor system 500 is depicted in accordance with an aspect of the present invention. The system 500 comprises a member 510 with a defect (e.g., fatigue, crack, early stage of breakage, . . . ). The member 510 is encompassed by a photo-elastic layer 520. A source component 530 emits light onto the layer 520 of photo-elastic material. As described supra, the light enters the photo-elastic material 520 and propagates. The light can be reflected within the photo-elastic layer 520. Upon exiting, the light can be received by a capturing component 540. As described infra, light emitted from the source component 530 to the photo-elastic layer 520 and light from the photo-elastic layer 520 received by the capturing component can be operated upon by a polarizing filter 550.

An early breakage detector 560 can be employed in connection with the capturing component 540 to detect defects in the member 510. The early breakage detector 560 analyzes the light received by the capturing component 540. Software algorithms can be utilized to monitor rotating members 510 for fatigue, cracking, early signs of breakage, etc. The software algorithms can employ various techniques to provide such results. For example, a birefringence pattern can be analyzed to determine whether the pattern is axisymmetric. A birefringence pattern which is not axisymmettical can indicate an early sign of failure of the shaft. A section of member 510 exhibiting an initial crack can show a stress concentration in the vicinity of the crack when analyzed by Early Breakage Detector 560. Alternatively, the software algorithm can be employed to examine the frequency response. An early sign of shaft failure is demonstrated by a frequency shift and/or frequency smearing resulting from a load change. Another indication of fatigue is exhibited by an impulse in the joint time-frequency response. Techniques such as joint time frequency analysis (e.g., wavelet analysis) are particularly well-suited to detect momentary fluctuations or impulses indicative of crack growth or defect initiation. Utilization of optical, neural-net torque sensors enables implementation of such software algorithms targeted at impulse, frequency response and joint time frequency-response for detecting early stages of shaft failure. Early detection of fatigue, cracks, etc. within the shaft prevents catastrophic events such as, for example, radial shaft cracks, sheared shaft material, axial shaft splits, etc.

Figure 6:
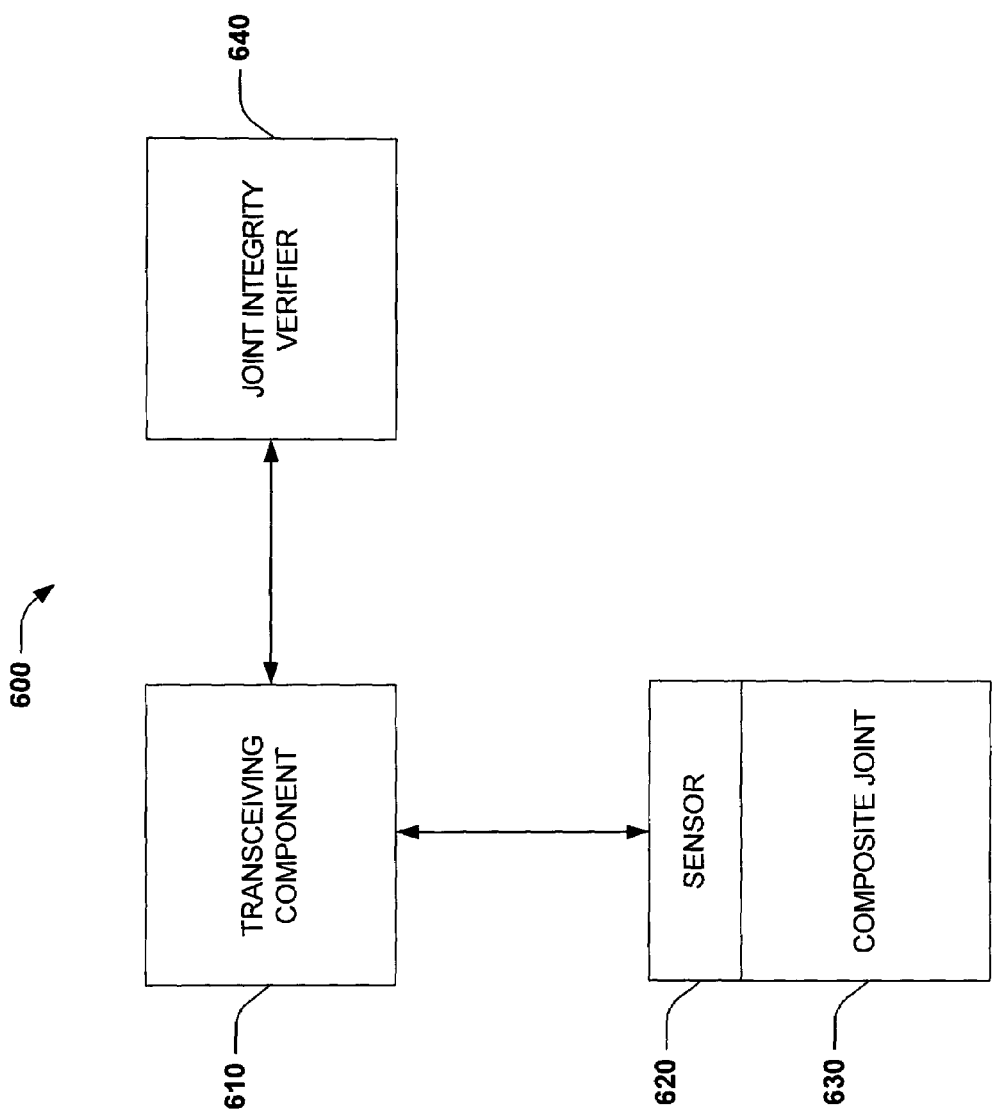
FIG. 6 is a system that detects defective composite joints in accordance with an aspect of the present invention.

Referring now to FIG. 6, a system 600 that detects defective composite joint(s) 630 between shafts or laminated structures is illustrated in accordance with an aspect of the subject invention. The composite structure can be a shaft or a structural (non-rotating) member. The composite portion for monitoring, inspection, or analysis can be a composite—composite joint such as a lap joint or a composite-metal joint such as in a lap or v-groove. The joint can be constructed utilizing a bonding material (e.g., epoxy), rivets, bolts, pins, or any similar methods and/or a combination of several methods. In this particular embodiment, the photo-elastic property of a sensor 620 is employed to reflect light in a radial direction and an axial direction in the vicinity of the surface to be monitored or analyzed such as composite structure or composite joint 630. This can be accomplished via geometric structures in the photo-elastic sensor 620 to modify and redirect the light path. Such structures will control the light path and can also introduce area of stress concentration that will improve the sensitivity of the sensor.

A joint integrity verifier 640 can be utilized to monitor data sent from a transceiving component 610 to provide an appropriate response based on such data. For example, the joint integrity verifier 640 can interpret received data to show an imminent failure of the composite joint 630 and subsequently take action (e.g., stop rotation of the shaft or reduce torsional loading) to prevent such a failure from occurring. The transceiving component 610 is employed to interface with the composite joint 630 and collect data from the sensor 620 regarding the surface condition of the joint 630. Such a design can provide a fringe pattern that can be interpreted by the joint integrity verifier 640 (e.g., artificial neural network) and can provide enhanced sensitivity since the number of fringes produced when the sensor 620 is deformed is proportional to the path length of the light traveling through the sensor 620. A light beam traveling into the sensor 620 and perpendicular to the surface can be reflected off the inside of sensor 620 adjacent to the composite joint 630. The reflected beam can then travel back through the sensor element 620 and exit the sensor in essential a path perpendicular to the surface of sensor 620. The sensitivity of the reflected beam can be limited by the sensor thickness 620 and the light path can be two times the thickness. For example, a sensor surface that is 0.5", the light path will be 1". By having light travel in the axial direction, the path length can be increased significantly. For example, a light sleeve (e.g., sensor 620) which is 0.5" thick can provide for a light path that is over 3" in a particular design.

Utilizing such a design can also exploit the "full field" characteristic of the photo-elastic material, when utilized to provide a full inspection around the circumference of the polymer sleeve (e.g., sensor 620). Thus, such a design can provide an inspection of a composite joint 630 to detect a surface malformation (e.g., weak or loose composite joint) which will be indicated by localized areas of stress concentration or non-reflected fringe pattern. An inspection of the reflected fringe pattern as the composite shaft rotates can provide an indication that the composite joint 630 is failing and can predict how fast and at what rate degradation is occurring. Furthermore, the inspection can be complete and cover the entire circumference or area of the joint within proximity of the sensor 620. In addition, the analysis can be performed in real time as the shaft rotates and experiences dynamic loading and stresses. Thus, the described system 600 can provide a low cost lightweight method of inspecting a composite drive shaft joint(s) 630 dynamically during operation. Also, the system 600 can be used to inspect static (e.g., non-moving) surfaces and structures.

Figure 7:
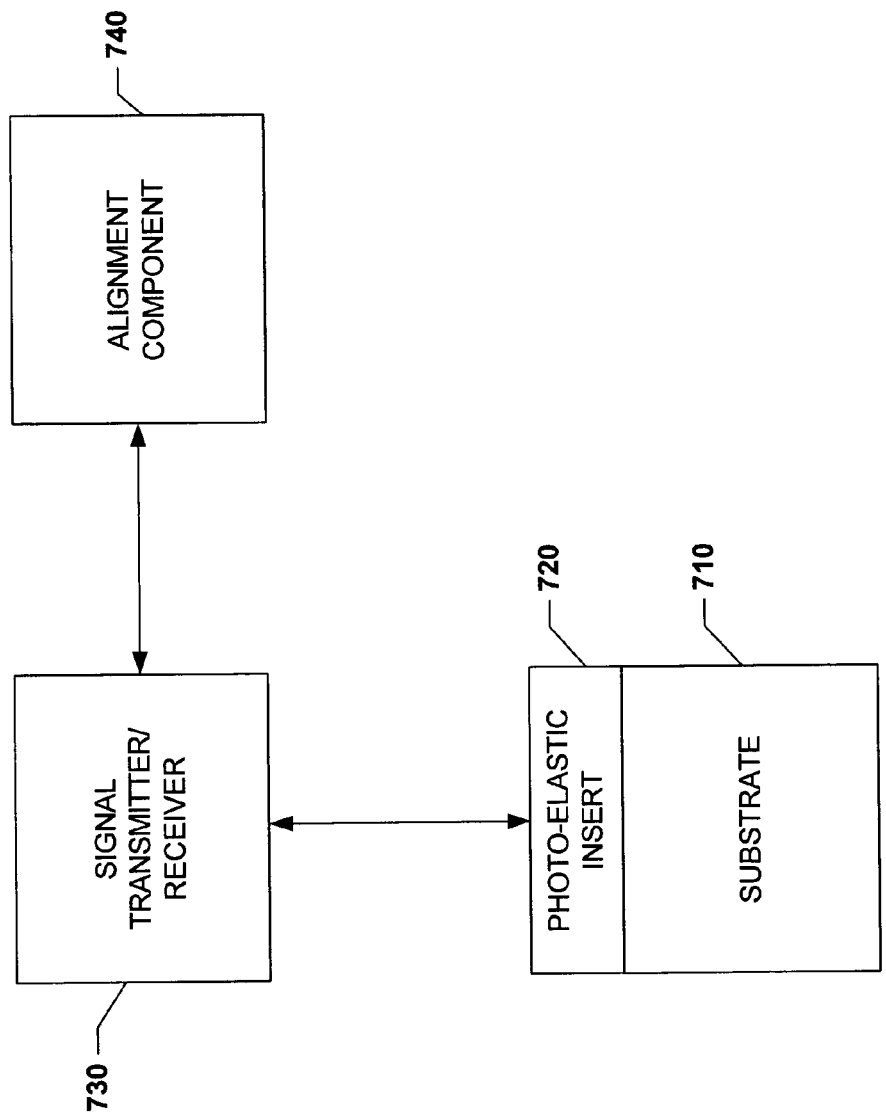
FIG. 7 is a system that interrogates system alignment in accordance with an aspect of the present invention.

FIG. 7 illustrates a system 700 that interrogates system alignment. The system 700 comprises a substrate 710 for which the alignment is measured. The substrate 710 can be, for example two shafts substantially connected utilizing a coupler (e.g., Dodge D-Flex coupler). A photo-elastic insert 720 can be employed within the substrate 710. For example, a photo-elastic insert 720 can be utilized with a Dodge D-Flex coupler to evaluate properties of coupled shafts. Several alternative geometries can be utilized to enhance axial deformation while not compromising torsional stiffness of the coupling (e.g., an accordion style cross section such as a bellows coupling style, a reflector angled at 45 degrees, . . . ).

The system 700 further comprises a signal transmitter/receiver 730. The signal transmitter/receiver 730 transmits a signal (e.g., light) onto the photo-elastic insert 720 and receives a signal (e.g., light) exiting from the photo-elastic insert 720. The received signal can be analyzed by an alignment component 740. By way of example, the alignment component 740 can determine the lateral and/or angular misalignment between two shafts and/or the combination of both lateral and angular misalignment. Additionally, axial strain can be measured between the shafts. Such parameters can be determined when the machine is in steady state (switched off) and/or dynamically as machinery operates.

Various parameters can be identified utilizing such a system 700. For example, a centrifugal pump coupled to a motor will exert several axial forces during operation (e.g., axial force resultant from pumping action of an impeller). Additionally, a motor coupled with a fan can exert an axial force as a function of air pressure, inlet opening and fan speed. Furthermore, evidence relating to poor or broken foot mountings, impeller damage, impeller wear, alignment problems, seal problems, imbalance problems, etc. can be determined. Additionally, thermal expansion can cause fluid carrying pipes to expand and thus cause axial loading on a shaft. This loading can accelerate bearing or seal failure. Such excessive or unexpected axial loading can be detected and quantified by the alignment component 740. The ability to continuously and dynamically determine the misalignment of two rotating shafts facilitates maintaining shaft alignment by utilizing small displacement-high force actuators (e.g., active alignment control) to facilitate that shafts are aligned.

Figure 8:
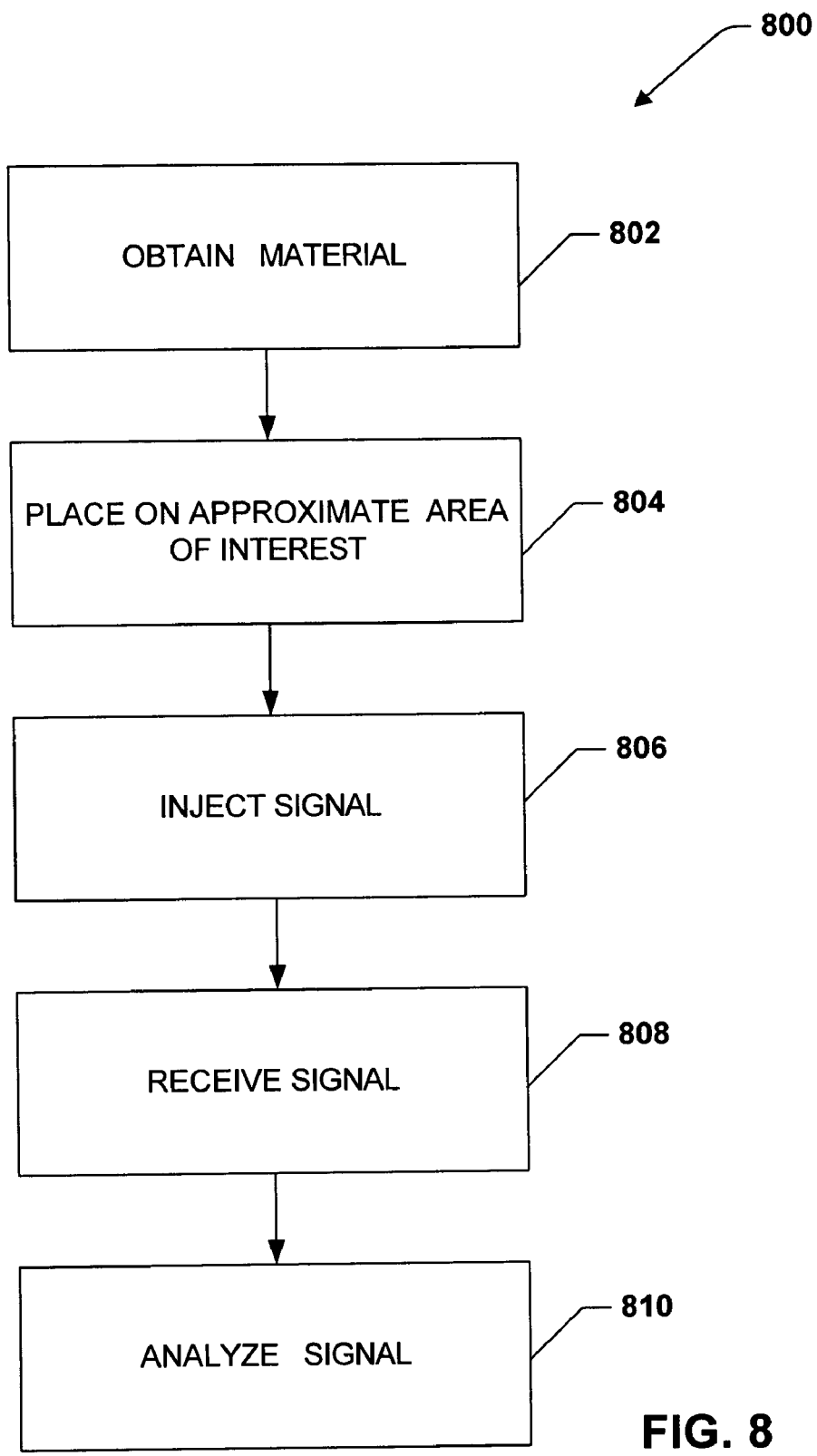
FIG. 8 is a flow diagram of a method that inspects an area of a structure in accordance with an aspect of the present invention.

FIG. 8 refers to a method 800 that inspects an area of interest on a structure in accordance with one aspect of the present invention is illustrated. While, for purposes of simplicity of explanation, the methodologies of the subject invention are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention. The invention may be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments.

At 802, the structure, which can be any type of material wherein the measurement of surface attributes of an approximate area of interest 804, is obtained. For example, the material can be a rotating shaft made of a metal which is employed in a larger mechanical system such as an aircraft. The surface of the structure can have disparate reflectivity properties (e.g., specular, non-specular, etc.) and dimensions. At 806, a signal is injected into the system to inspect an approximate area of interest on the surface of the material. The signal can be a light source such as for example, within the ultraviolet, infrared or visible spectrums. In addition, the path the signal travels can be determined by a substrate such as a photo-elastic sleeve. For example, a laser can inject light into a polymer photo-elastic sleeve which closely follows the features of the surface to be inspected.

At 808, the signal is received by a detector. The entering and exiting light can be polarized before being received by a detector. The received signal can be either transmitted through the sensor element (transmission-mode photoelasticity) or injected into the sensor element and internally reflected out (reflection-mode photoelasticity). For example, a laser signal transmitted at 806 and exiting the sensor element can be received by charge couple device (CCD) array. Further, a memory device can be operatively connected to such a receiving device to store data to be utilized at a later time. After the data has been received, it can be analyzed at 810 local to the location the signal is received or via a remote connection such as connected via a data network. Signal analysis can employ a multitude of algorithms, for example, to equate the signal with inspected areas and determine if the attributes of such areas, wavelengths, and amplitudes fall within desired tolerances. Analysis can, for example, determine whether an imminent failure condition exists such as shaft fatigue, cracking, early signs of breakage; axial and/or lateral misalignment, and/or composite joint failure.

Figure 9:
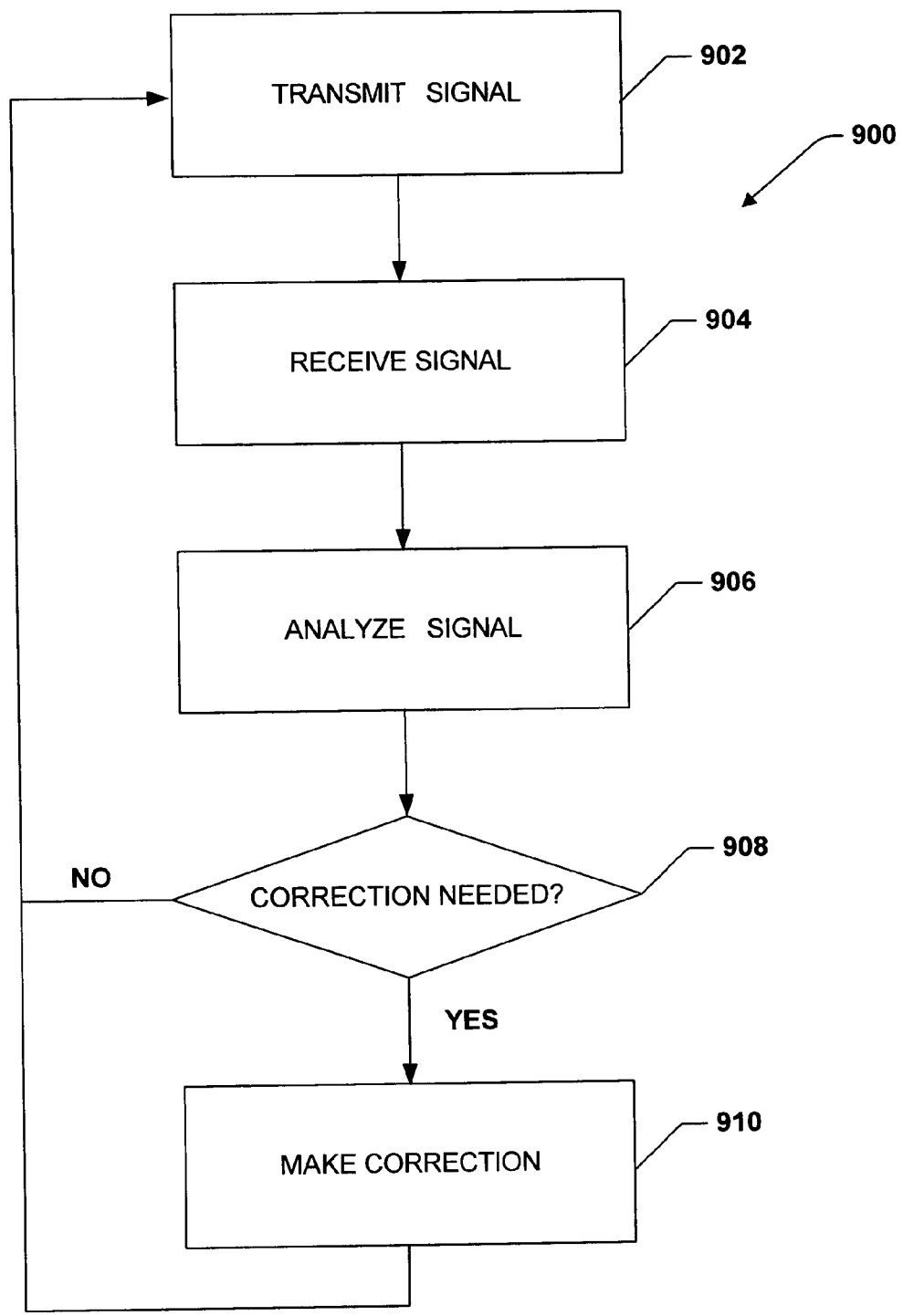
FIG. 9 is a flow diagram of a method that analyzes and corrects in accordance with an aspect of the present invention.

FIG. 9 illustrates a method 900 that analyzes a signal to determine if corrective action is needed (e.g., to relieve an errant condition). At 902, a signal is transmitted and can be injected into a photo-elastic sleeve as described supra. Such a signal can be received at 904 after it has interacted with a system utilized to inspect a desired surface by a component calibrated to interpret and quantify the signal, for example.

Analysis of the signal occurs at 906 wherein the signal can be converted (e.g., A/D) to provide a coherent computer-based digital analysis of the signal. The analysis can utilize mathematical or empirical stages to provide a result such as a surface profile, intensity pattern, or image profile. The received signal can have one or more features extracted from the sampled data. The set of features can be utilized as input to a classification and interpretation algorithm. The algorithm may interpret the extracted features in the time domain, frequency domain, joint time-frequency domain, or other analysis as deemed appropriate to determine the level of loading (e.g., torque), dynamic conditions of the load and state or condition of the components in the system during dynamic loading conditions. At 908, a query is made to determine if a correction is appropriate for the system inspected. This query can be based on desired tolerances representative of a signal profile, which can indicate a misalignment or surface malformation that indicates a correction. Such a condition can be corrected at 910 utilizing, for example, employing a smart material holder to re-position a bearing to alleviate misalignment of a shaft. The method begins again at 902 after the correction is made to provide a closed loop system wherein the system is periodically monitored and adjusted as desired.

Figure 10:
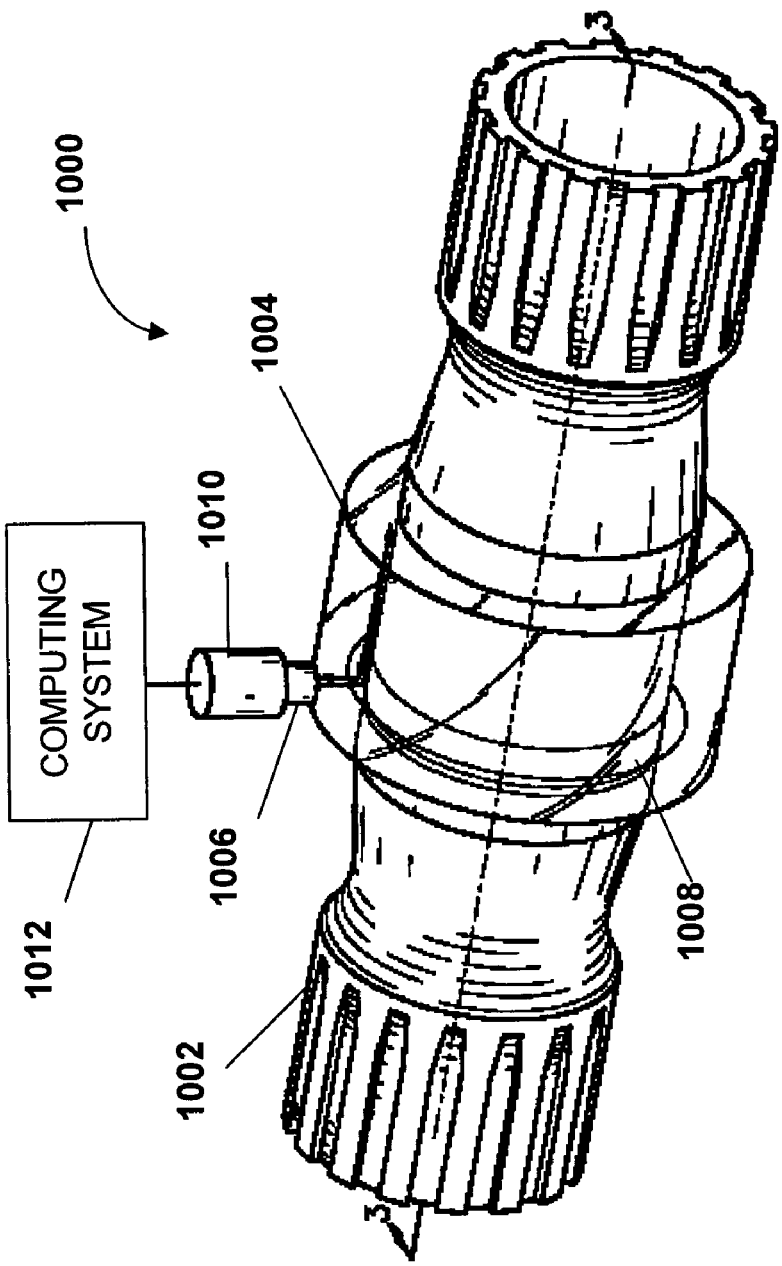
FIG. 10 is a perspective diagram of an exemplary optical torque sensor in accordance with an aspect of the present invention.

Referring now to FIG. 10, there is illustrated a perspective view of an exemplary optical torque sensing system 1000 in accordance with one aspect of the present invention. The optical torque sensing system 1000 comprises a rotating shaft 1002, wherein a portion of the rotating shaft 1002 is encircled by a sleeve of photo-elastic material 1004. Although the rotating shaft displayed in FIG. 10 is cylindrical, it is to be understood that a shaft of any shape (e.g., triangular, square, octagonal . . . ) can be used in conjunction with the present invention, and the photo-elastic material conformally formed about at least a circumferential portion of the shaft 1002. Generally it would be desirable for the sleeve of photo-elastic material 1004 to be a lightweight, durable, and inexpensive material such as polycarbonate. However, it is to be understood that the present invention contemplates employment of any suitable photo-elastic material or the like capable of conducting electromagnetic energy (e.g., white light). For example, polycarbonate-based compounds, polyester-based compounds, polysulfone-based compounds, polyether sulfone-based compounds, polystyrene-based compounds, polyolefin-based compounds, polyvinyl alcohol-based, cellulose acetate-based compounds, polyvinyl chloride-based weight compounds, polymethyl methacrylate-based compounds, polyacrylate-based compounds, polyamide-based compounds, glasses and/or a combination of the above may be employed in connection with the invention. Characteristics of the material 1004 can include, for example, essentially transparent at the wavelengths employed for the transmission beam and exhibit a suitable strain-optic coefficient (e.g., a fringe pattern is exhibited as the material undergoes the strain amount expected in the target application).

Although the photo-elastic material 1004 is depicted as a continuous collar/sleeve, the present invention is not so limited. For example, a small section of photo-elastic material can be attached to the shaft 1002. Optical detection can be synchronized (e.g., via a sync, pulse, encoder pulse, or pattern recognition) to sample the light when the photo-elastic component is at he correct location.

Figure 11B:
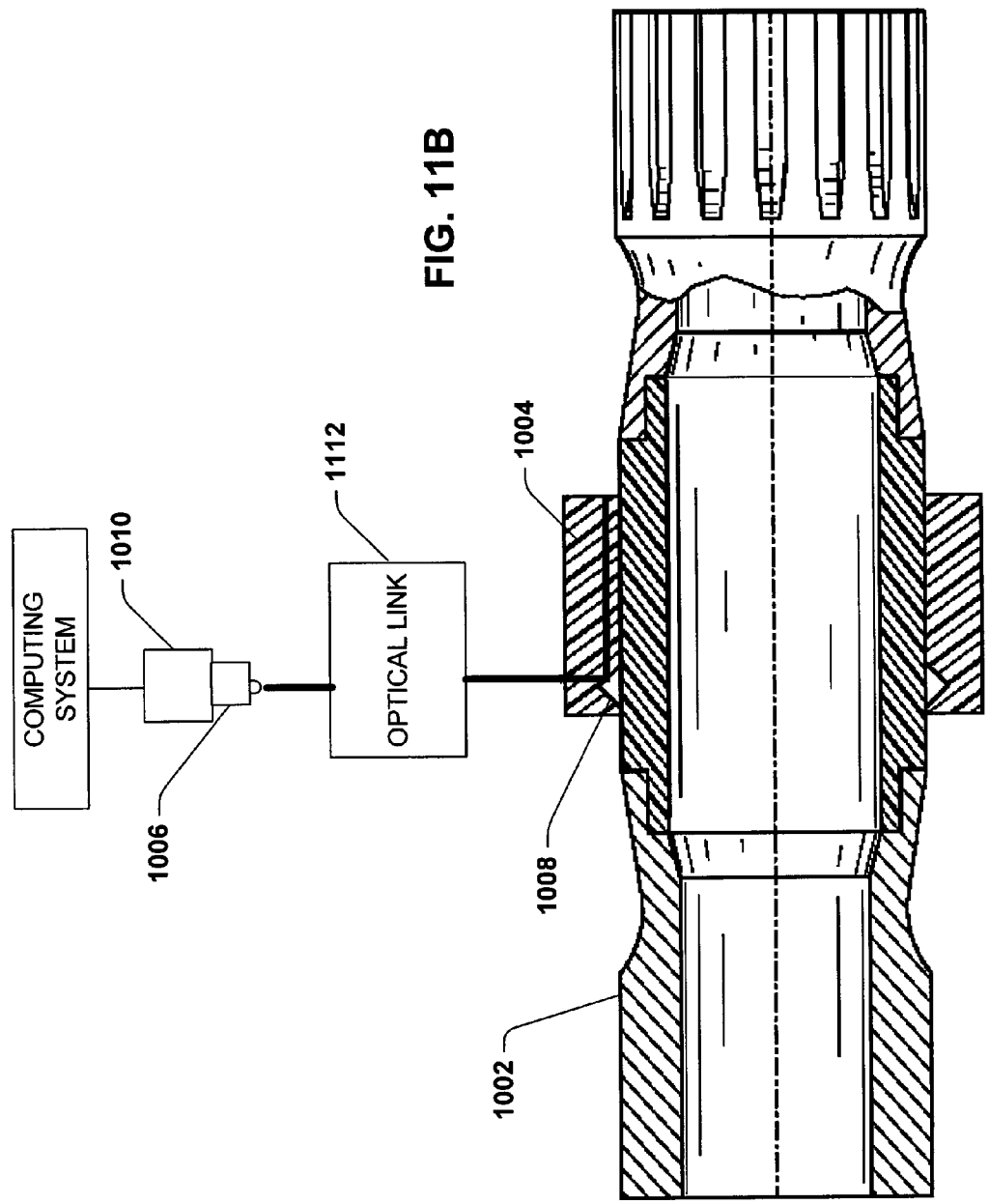
FIG. 11B is a cross-sectional diagram of the exemplary optical torque sensor of FIG. 10 in accordance with an aspect of the present invention.
Figure 12A:
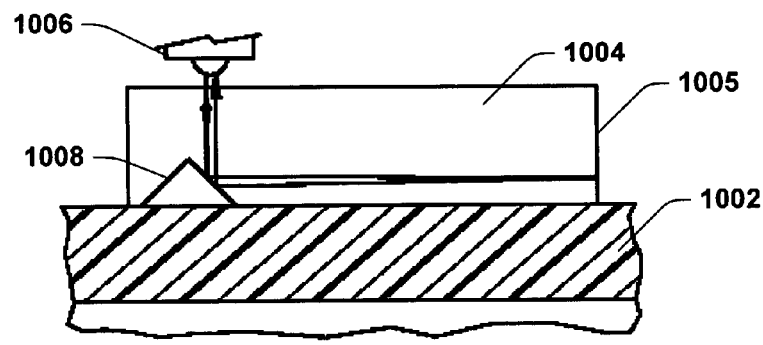
FIG. 12A is an enlarged view of the exemplary optical torque sensor of FIG. 10 in accordance with an aspect of the present invention.
Figure 12B:
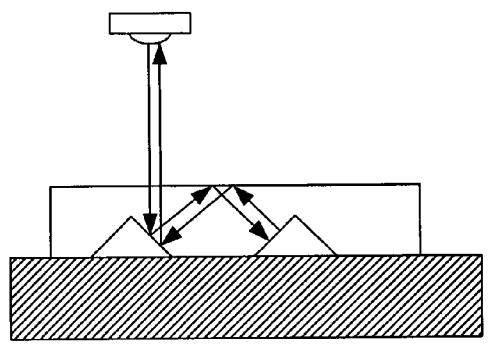
FIGS. 12B–12E illustrate employment of photo-elastic material in a variety of shapes/configurations in connection with directing light in accordance with the subject invention.
Figure 12C:
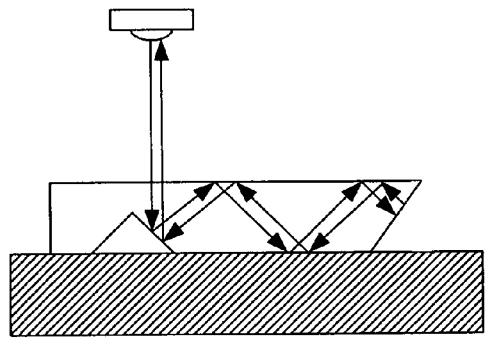
Figure 12D:
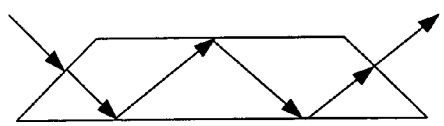
Figure 12E:
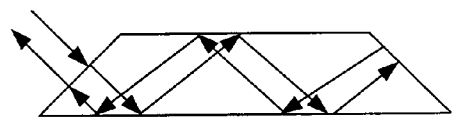
Figure 13:
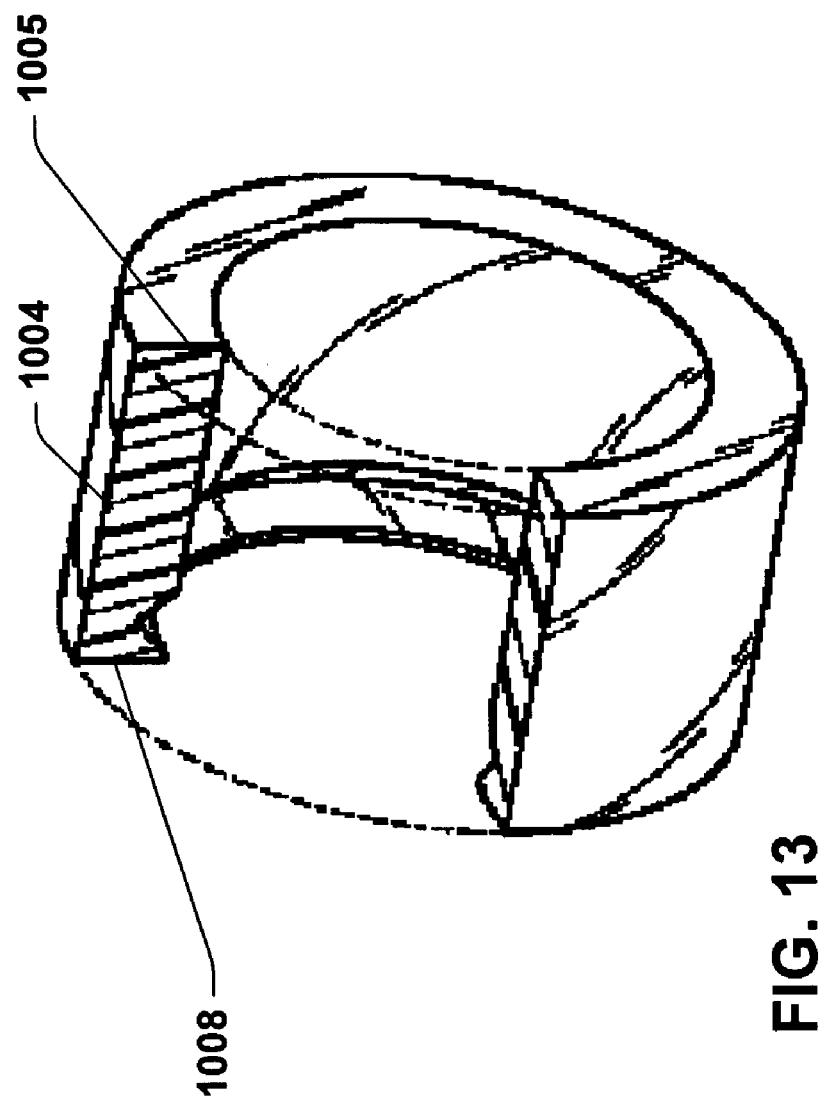
FIG. 13 is a perspective cut-away view of an exemplary photo-elastic sleeve in accordance with an aspect of the present invention.

The optical torque sensing system 1000 further comprises a light emitting component 1006 that delivers light into the photo-elastic sleeve 1004. The light emitting component 1006 can be a light emitting diode (LED), a laser diode, incandescent lamp, florescent lamp, or any other adequate source of light. Coherent light is not required for this sensor. Inexpensive, wide band wavelength sources can be used. Before reaching the photo-elastic material and upon exiting the photo-elastic material before being input to the receiver, the light source can be passed through a polarizing filter. This filter can be a linear, circular, or other such polarizing filter constructed from glass or inexpensive plastic. In accordance with one aspect of the present invention, the light-emitting component 1006 delivers light perpendicularly into the photo-elastic material 1004. Turning briefly to FIGS. 11–13, alternative views of the exemplary optical torque sensing system of FIG. 10 are displayed. FIGS. 11A–11B display a cross-sectional view of the optical torque sensing system 1000, FIG. 12A displays an enlarged view of the photo-elastic sleeve 1004 and the light-emitting component 1006, and FIG. 13 displays a perspective cut-away view of an exemplary photo-elastic sleeve 1004. As illustrated in FIGS. 11–13, the photo-elastic sleeve 1004 includes a notch 1008, wherein edges of the notch (e.g., v-groove) 1008 are at an angle (e.g., 45°) to the light delivered by the light emitting component 1006. The notch can be employed as a beam splitter if desired so as to direct light in more than one direction so as to facilitate interferometric based analysis of the shaft. The notch 1008 can be coated with a reflective substance to facilitate directing the light through the photo-elastic sleeve 1004 along a longitudinal axis of the rotating shaft 1002. It is to be appreciated, however, that a notch with an angle is not required to practice the present invention. For example, the light emitting component 1006 can be configured to initially deliver light along the axis of the rotating shaft 1002, thereby not requiring a notch in the photo-elastic material 1004. The present invention is meant to include any method of directing light through a photo-elastic material along the axis of a rotating shaft. For example, mirrors can be employed to direct the light in accordance with the present invention. Accordingly, any suitable means for directing light about a predetermined portion of the shaft is contemplated and intended to fall within the scope of the hereto appended claims.

The light travels along the axis of the rotating shaft 1002 until an edge 1005 of the photo-elastic material 1004 is reached. In accordance with an aspect of the present invention shown in FIG. 12A, a collar of the photo-elastic sleeve 1004 is coated with a reflective substance such that the light will reflect back through the photo-elastic sleeve 1004. The length of the path traveled by the light is thus doubled, thereby increasing sensitivity of the optical torque sensing system 1000 by a factor of two. In another aspect of the present invention, the collar of the photo-elastic sleeve 1004 is not coated, thereby allowing the light to exit the photo-elastic sleeve 1004—a collection device/system can be placed at the exit portion of the sleeve to gather the light and pass the data in connection therewith to a processing system to analyze the data in connection with determining and/or inferring properties and/or states with respect to the shaft and/or machine(s) utilizing the shaft. Thus, the invention provides for collecting information regarding the shaft from at least two orthogonal directions with respect to the shaft.

It is to be appreciated that in lieu of a sleeve or collar based photo-elastic material, the invention can employ the photo-elastic material in a variety of shapes/configurations (e.g., strip, block, triangle, angles that allow for multiple traverses of light through axial length, use of shapes to split beams in multiple directions (+ and − axes) along the axial length or radially . . . )—as illustrated in FIGS. 12A–12E—to accommodate a particular shape of a shaft and facilitate collection data about a surface thereof. The increased beam path length through the photo-elastic material will proportionally increase the phase shift exhibited for a given angular strain and therefore increase the sensitivity of the torque sensing element. Moreover, it is to be appreciated that the photo-elastic material can have dopants, photosensitive materials (e.g., europium chelates), gratings etcs. embodied therein to facilitate gathering data regarding the shaft (e.g., pressure, temperature, velocity, acceleration . . . ).

Returning to FIG. 10, when the light exits the photo-elastic sleeve it is captured by a capturing component 1010. The capturing component is typically placed wherever the light delivered by the light-emitting component 1006 exits the photo-elastic sleeve 1004. The capturing component 1010 can utilize polarizing filters to capture the fringe pattern that results from polarized light encountering strain in the photo-elastic material 1004. The capturing component 1010 relays data relating to the shaft to a computing system 1012 for processing. In accordance with one particular aspect of the present invention, the capturing component 1010 is a digital camera, wherein the captured fringe pattern can be quickly relayed to the computing system 1012 as digital data. It is to be appreciated that analog data can be passed to the computing system 1012 as well and analyzed in accordance with the present invention. The capturing component 1010 can also be a CCD array, a linear detector array, or a group of separate optical detector elements.

Measurements of stress and strain have proven to be extremely valuable tools applicable to a wide range of machinery design, analysis, and control systems. The subject invention via employing a photoelastic material is widely applicable for various industrial applications to sense dynamic loading and torque on a rotating shaft. For example, the system 1012 can provide a measurement of speed, steady state torsional load (torque) and dynamic loading of a composite drive shaft (e.g., driving a rotor gearbox). Such drive shafts can for example be used in aircraft like a helicopter tail rotor drive shaft or in a high temperature superconducting motor. Systems such as this are widely used in dynamometer test stands such as employed for vehicle emissions testing. The measured torsional load signal can be accurate and can indicate when critical load thresholds are exceeded. A high frequency torque signal beyond 10 kHz for example can be obtained from this system 1012. Real-time information on dynamic loading of the mechanical system can provide valuable information describing actual system stresses experienced and can provide early indication of mechanical component degradation or unusual operation such as impact loading. For example, dynamic loading information during aircraft operation can be interpreted in a frequency domain or joint time-frequency domain. This information can indicate early stage degradation or the existence of incipient faults in gears, bearings, tail rotor, couplings, mountings, aircraft structural components, or other rotating or stationary mechanical components. Analysis of sampled high frequency load information can indicate occasional load pulses or transient loads that exceed a threshold where component damage is occurring. It is frequently desired to monitor the excursions beyond a threshold, non-damaging torque level. The existence of these torque events can be readily detected, recorded, and the time duration logged to provide a measure of the accumulated damage that may be occurring to critical aircraft rotating components. The subject invention can sense both torsional and axial loading in steady state and transient loading conditions. Such design permits surface area inspection and the detection of bending moments or changes in axial loading. The optical shaft load sensing system provides novel and important prognostics and control information that can lead to reduced probability of component failure and reduced weight of key mechanical components.

FIG. 11B depicts light emitting component 1006 and capturing component 1010 located remotely from photoelastic component 1004 according to an aspect of the present invention. An optical link 1112, such as, for example, a fiber optic cable, can be utilized to connect these components. According to another aspect of the present invention, a fiber optic link can be employed to interface to multiple units. Furthermore, a single optical link 1112 can link multiple sensor elements (e.g., photo-elastic components 1004).

Figure 14A:
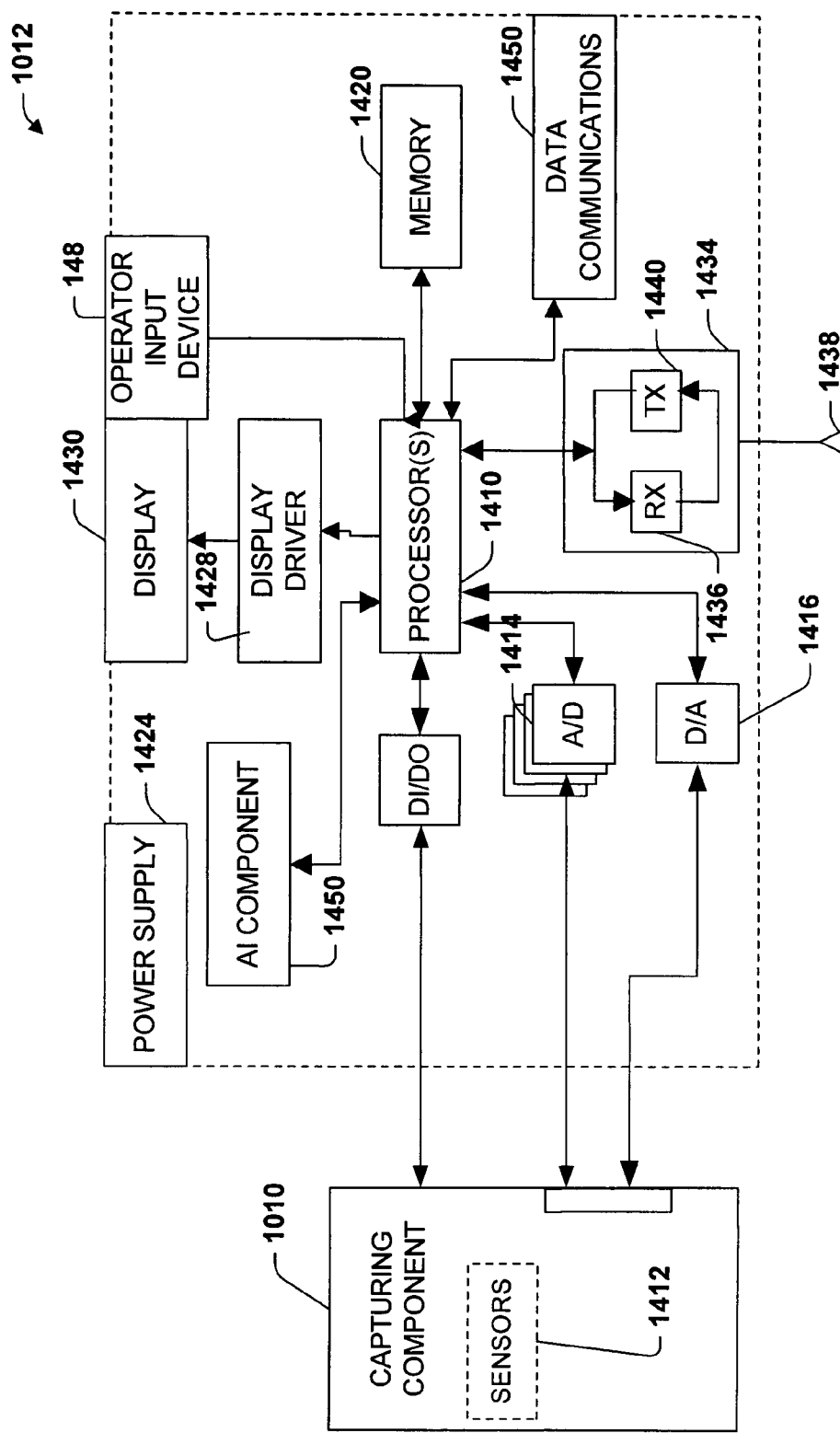
FIG. 14A illustrates details of one particular exemplary implementation of a computing system in accordance with the subject invention.

FIG. 14A illustrates further details of one particular exemplary implementation of the computing system 1012 in accordance with the subject invention. The system 1012 includes processor(s) 1410 that analyze information received from the capturing component 1010. The capturing component 1010 can optionally include and/or be operatively coupled to sensor(s) 1412 that collect other types of data (e.g., vibration, temperature, pressure, humidity, voltage, current . . . ) that can be utilized to facilitate gleaning information regarding the shaft 1002 and machinery employed in connection therewith. To this end, the capturing component is coupled to the processor(s) 1410 via A/D converter 1414 and/or D/A converter 1416. As noted supra, the system 1012 can process analog and/or digital types of data. The A/D converter for example can be an array of 4, 8 or more elements in parallel or serially.

The system 1012 includes a memory 1420 that stores program code, base-line information (e.g., nominal torsion, acceptable strain, expected stress, loading information, duty cycle data, critical frequencies, amplitude-frequency information, control information, and appropriate torsion values, nominal optical intensity values, neural network parameters, or fuzzy logic rules and functions), machine specific data, acceptable error bounds/deviations, historical torque parameter data, recommended corrective action and/or historical operating and torque data. The system 1012 may also include a power supply 1424 (that provides power to the processor(s) 1410, sensors 1412 and other components—the system can be self-powered via scavenging energy from the environment such as utilizing a rotating shaft (e.g., Farady effect), vibration (e.g., piezo-electric energy harvesting) or illumination (e.g., photovoltaic cells)), a display driver circuit 1428 (that couples the processor(s) to the display 1430), RF section 1434 (that includes a receiver 1436, an antenna 1438, a transmitter 1440 that transmits and receives signals.

It is to be appreciated that the system 1012 can function as and/or employ an interferometer in connection with analyzing light exiting the photoelastic material with suitable change in the optical elements and detector (e.g., injection of coherent light, appropriate beam-splitter element(s) and reflective components).

The system 1012 can further include an artificial intelligence (AI) component 1450 that can be employed in connection with performing automatic and/or inferred action in connection with the subject invention. The AI component 1450 can employ any of a variety of suitable classification schemes and/or systems (e.g., support vector machines, neural networks, expert systems, Bayesian belief networks, Hidden Markov Models, fuzzy logic, data fusion engines, non-linear training systems . . . ) in connection with the subject invention. The AI component 1450 can include seed classifiers that have been explicitly trained as well as classifiers that are implicitly trained. The AI component 1450 can facilitate diagnosing as well as prognosing states with respect to the shaft as well as machinery employed in connection therewith.

The system 1012 is designed to provide highly accurate and up-to-date information regarding the state and future state of the shaft 1002 as well as desired and acceptable related machinery and process operating levels or conditions. The system 1012 can compare known and measured data with acceptable parameters and projected shaft aging to establish a recommended maintenance action and when such maintenance should be performed. This information can be communicated to an operator or other computer system as appropriate. Alternatively, predicted state information can be used to prescribe a change in control such as to avoid reaching a defined level of torsion loading. Alternatively, an operator or aircraft pilot can be notified of exceptional conditions that warrant a change in operation or control to protect machinery, the process, the environment, or human life.

It is to be appreciated that the system 1012 can perform substantially all analysis with respect to the shaft 1002 and/or a portion of such analysis. The wireless component 1434 and/or data communications component 1450 can be employed to provide the data and/or analysis to other computing systems. Moreover, with respect to powering the system 1012, a magnetic field can be employed in connection with a rotating component of the shaft, to make the system 1012 self-powering.

In one embodiment of the subject invention, the computing system 1012 can determine torsion strain found in the rotating shaft 1002 in real time via a fringe pattern. The image sent to the computing component 1012 can be in digital or otherwise, and in color or grayscale. Furthermore, the computing component 1012 can convert a color image delivered from the capturing component 1010 into a grayscale image (and vice versa), and convert an analog image into digital data. A grayscale image can be beneficial because the computational cost of processing a grayscale image is generally less than the computational cost of processing a color image.

The computing component 1012 can also utilize diagnostic and prognostic techniques in order to inform an operator on the present/future state of the rotating shaft 1002. For example, the computing component can use diagnostic techniques to inform an operator that the current torsion strain on the rotating shaft 1002 is too great. Under these operating conditions, damage can begin to accumulate. The computing component 1012 can continuously keep track of the accumulated damage and utilize this information as an input to a prognostic function and operator notification function. Furthermore, the optical torque sensor 1000 can create an image of the entire surface of the portion of the rotating shaft 1002 encircled by the photo-elastic sleeve 1004 upon one rotation of the rotating shaft. The computing component 1012 can thus determine any malformations in the rotating shaft 1002 and utilize a diagnostic system to inform an operator that the rotating shaft 1002 needs replaced/repaired. Such component can also be used to inspect a coupling joint (e.g., composite shaft coupling), the adhesive between the several bonded elements, the bolted or riveted joint, and the internal integrity of the composite material. This type of analysis was unavailable for dynamic, rotating structures utilizing the prior art.

Alternatively, the computing component 1012 can use prognostic techniques to approximate a future time when replacement/repair of the rotating shaft 1002 will be necessary. The computing component 1012 can use inferential techniques based on the operation and tasks, prior tasks, etc. to determine a future state of the rotating shaft 1002. The use of prognostic techniques in connection with the present invention has several advantages deriving from the predictability of shaft failure, including shaft replacement, decreased storage costs, decreased shipping costs, convenience, decreased downtime, improved operation, etc. For example, in the case of a rotating shaft within a machine utilized on a production line, the optical torque sensing system 1000 could be utilized in conjunction with prognostic techniques to schedule repair and/or replacement. Therefore the operator of the machine would know when to have replacement parts available and could schedule repair of the shaft at a time when production loss would be minimized. Additionally, this information can be used for machinery or job scheduling to minimize the risk or loss due to a machinery failure. Less critical or less demanding processing can be assigned to the process line with the degraded or weakened component. Similarly, the decision to embark on a flight mission or to attempt to return to base can be made with additional information provided by the prognostic module. For example, a safe landing away from base can be a preferred operating strategy rather than risk crossing a waterway or risk crossing hostile territory.

Because the optical sensing system 1000 of the present invention can be employed not only to determine torsion strain but also rotational speed, displacement, acceleration, vibration, temperature, longitudinal strain, axial strain, high-frequency load sensing, lateral load sensing, and surface monitoring, diagnostic and prognostic techniques utilized in connection with the present invention can be extremely accurate.

As noted supra, the computing system 1012 can employ explicitly as well as implicitly trained classifiers in connection with inferring which parameters (e.g., rotational speed, acceleration, torsion strain, . . . ) regarding a rotating shaft to compute and/or relay information to other external components (e.g., a control component, a display component, a storage component . . . ). For example, the computing system 1012 can be implicitly trained by watching an operator over time to learn how the operator typically controls and protects the shaft. The computing component 1012 can employ a utility-based analysis wherein the cost of computing and/or relaying undesired shaft parameters can be factored against the benefits of computing and/or relaying desired shaft parameters in connection with a particular operator and operating state.

The present invention has several advantages over the prior art in that the invention is lightweight, small, reliable, noise immune, has high dynamic performance, and is inexpensive while maintaining a large coverage area of the rotating shaft 1002. The ability to monitor a large surface area of a rotating shaft and the determination of longitudinal strain are other novel aspects of the subject invention. The ability to continually monitor critical composite structures and couplings provide a novel and important benefit. The inability of the prior art to insure the integrity of composite joints and structures was a major roadblock preventing more extensive use of composites in airframe structures and dynamic components.

The present invention is also capable of a much more accurate measure of torsion strain as compared to prior art torque measuring systems, as the sensitivity of an optical sensing system utilizing the photo-elastic effect depends on distance traveled by the light through the photo-elastic material. Because the light delivered by the light emitting component 1006 is directed along the axis of the rotating shaft 1002, the length of the path traveled by the delivered light in the present invention is generally significantly greater than the length of the path traveled by the light in the prior art (e.g., that prescribed a radial light path).

Figure 14B:
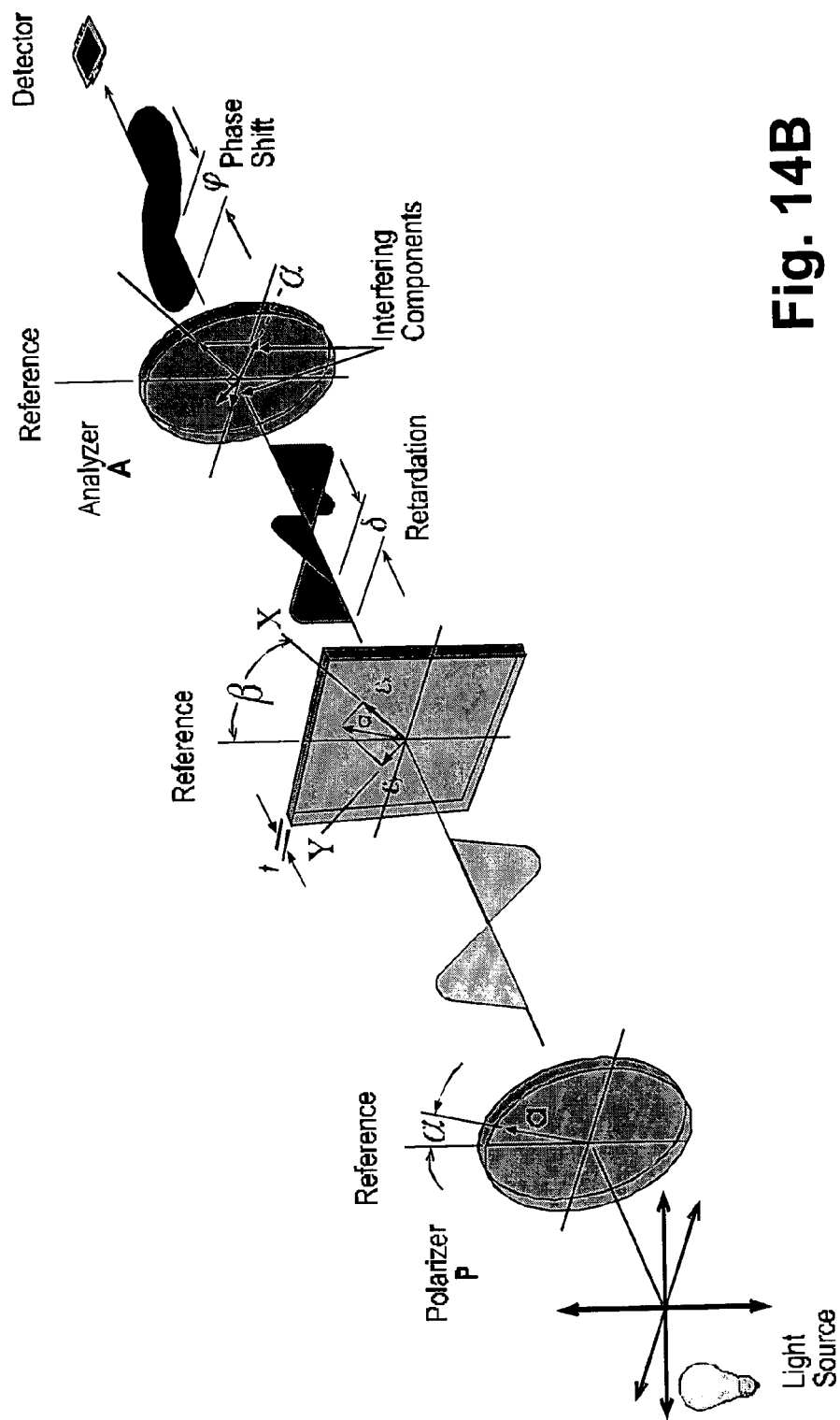
FIG. 14B illustrates a photoelastic effect in accordance with the subject invention.

FIG. 14B illustrates a photoelastic principle in accordance with the subject invention. The photoelastic principle can provide a qualitative analysis of deformation or residual strain in manufactured components. A polymeric material in accordance with the subject invention can be cast, machined, extruded, dipped, or even sprayed on a part. Typically, an expert interprets the fringe pattern—areas of narrow, grouped fringes represent areas of strain concentration to determine a qualitative estimate of strain in a static (e.g., non-rotating) part. A very rough quantitative estimate can be accomplished utilizing a comparator. A hand-held comparator can be held near the photo-elastic component and the strain in the hand held unit is manually adjusted until the same fringe color is observed in both the test part and the hand held comparator. The amount of strain induced in the hand-held comparator is utilized as an estimate of the strain existing in the test part. This provides only a point estimate, is very limited in accuracy, and does not permit dynamic strain (or torque) sensing during machinery operation.

Many glasses and plastics exhibit an effect called the photo-elastic effect. These materials exhibit a change in the index of refraction as a function of the difference in principle strains. When viewed with polarizing filters, a birefringence pattern is produced. The birefringence pattern is a function of the material strain, wavelength of light, material thickness, and material strain-optic coefficient. The resultant strain (or micro-strain) can be interpreted using an optical inspection device (e.g., polariscope) or alternatively by using a trained classifier or the like. A part under study, such as a drive shaft or other mechanical component, can be coated with the photoelastic material. As the part deforms, a trained classifier observes the resultant fringe pattern from the photoelastic material and determines a resultant component strain or applied torque in the case of a drive shaft. The physics of the photoelastic effect provides many opportunities for integrating the photoelastic material with the component under study. The photoelastic effect can be employed using either transmitted light or reflected light as described herein. The following describes the physics of the photoelastic effect in accordance with the subject invention.

As a beam of polarized light enters the photo-elastic material, the incoming beam is resolved into two orthogonal circularly polarized components. Each component travels through the material with a different velocity. When the beams exit the material, the phase-retarded beams are passed through a polarizer (analyzer) to generate a two-dimensional intensity pattern. The intensity pattern represents the relative phase shift between the two beams as shown in FIG. 14B.

When linearly polarized light passes through a strained photoelastic material and is viewed through a polarizer, colorful fringe patterns are observed. These two-dimensional optical fringe patterns can be used for stress analysis. According to Brewster's Law, the relative change in index of refraction (n) is proportional to the difference in principal strains ($\epsilon$) as shown in Equation 1. The constant of proportionality, K, is calls the "strain-optic" coefficient. The amount of phase shift (e.g., relative retardation $\delta$) is a function of wavelength of light, material thickness, t, strain-optic coefficient, K and the difference in principal strains, ($\epsilon_1-\epsilon_2$), as shown in Equation 1. The photoelastic effect is typically used in transmission as shown in FIG. 14B or in reflection. The relative phase retardation of the beam exiting the photoelastic material is given by $\delta$ in Equation 1.

$$\delta = t(n_1 - n_2) = tK(\epsilon_1 - \epsilon_2) \quad (1)$$

Using this relation, the intensity of light, I, exiting the analyzer is given by Equation 2.

$$I = a^2 \sin^2(\pi \delta \lambda) \quad (2)$$

Where $\lambda$ is the optical wavelength. Note that the intensity of light emerging from the photoelastic material will be zero whenever $\delta=0$, $\delta=1\lambda$, $\delta=2\lambda$, $\delta=3\lambda$, ... or in general, $\delta= N\lambda$ where $N=[1,2,3,\ldots]$. N is called the fringe order and can be combined with Equation 1 to give:

$$\delta = N\lambda = t(n_1 - n_2) = tK(\epsilon_1 - \epsilon_2) \quad (3)$$

In (3), t is the thickness of the photoelastic material, $n_i$ is the index of refraction for the i-th component, $\epsilon_1$ is the strain intensity along the i-th axis, and K is a parameter of the material called the strain-optical coefficient.

In accordance with the subject invention, the photoelastic material covers a portion of the shaft material (e.g., in the form of a collar or sleeve). Light enters the material from a radial direction and is reflected off the inside surface thereof, and reflected back through the material in a radial direction where it is sensed with an optical device such as for example a photodiode array. Since the photoelastic material can be used in reflection (rather than just transmission), the light beam passes through the optical material twice. The equation to be used to compute the number of fringes for the torsional load sensor is given by (4).

$$N = 2tK(\epsilon_1 - \epsilon_2)/\lambda \quad (4)$$

The resulting two-dimensional fringe pattern is quantifiable and reproducible. Therefore, this problem can be viewed as a general, 2-dimensional pattern classification problem. A classifier (e.g., neural network) is well suited to this problem and has been shown to be a fast, efficient, and accurate solution method for this application. A photoelastic sensor in accordance with one specific embodiment of the subject invention can be characterized as a dynamic load sensor due to the broad range of sensing capabilities and the availability of high frequency torsional load information in addition to speed and low frequency torsional load values (e.g., torque).

Reflecting a radial beam of light through the transparent collar, off the inside surface of the collar, and back out through the collar can provide an image associated with the localized shear of the photo-elastic material and therefore torsional strain of the composite shaft material. Using Young's modulus, strain can be converted to shaft torque. The radial beam of light can be reflect along the axial direction of the photo-elastic material and can provide an image associated with both torsional strain and angular or longitudinal strain of the shaft. The longitudinal strain values can be determined dynamically during shaft rotation. In such mode of operation, an entire circumference of the sensor surface can be imaged during one complete shaft revolution. This technique can be used to indicate localized faults under the sensor element or bending moments of the shaft. Locating the photo-elastic sensor over a shaft joint can provide for complete, dynamic inspection of the joint surface.

Figure 14C:
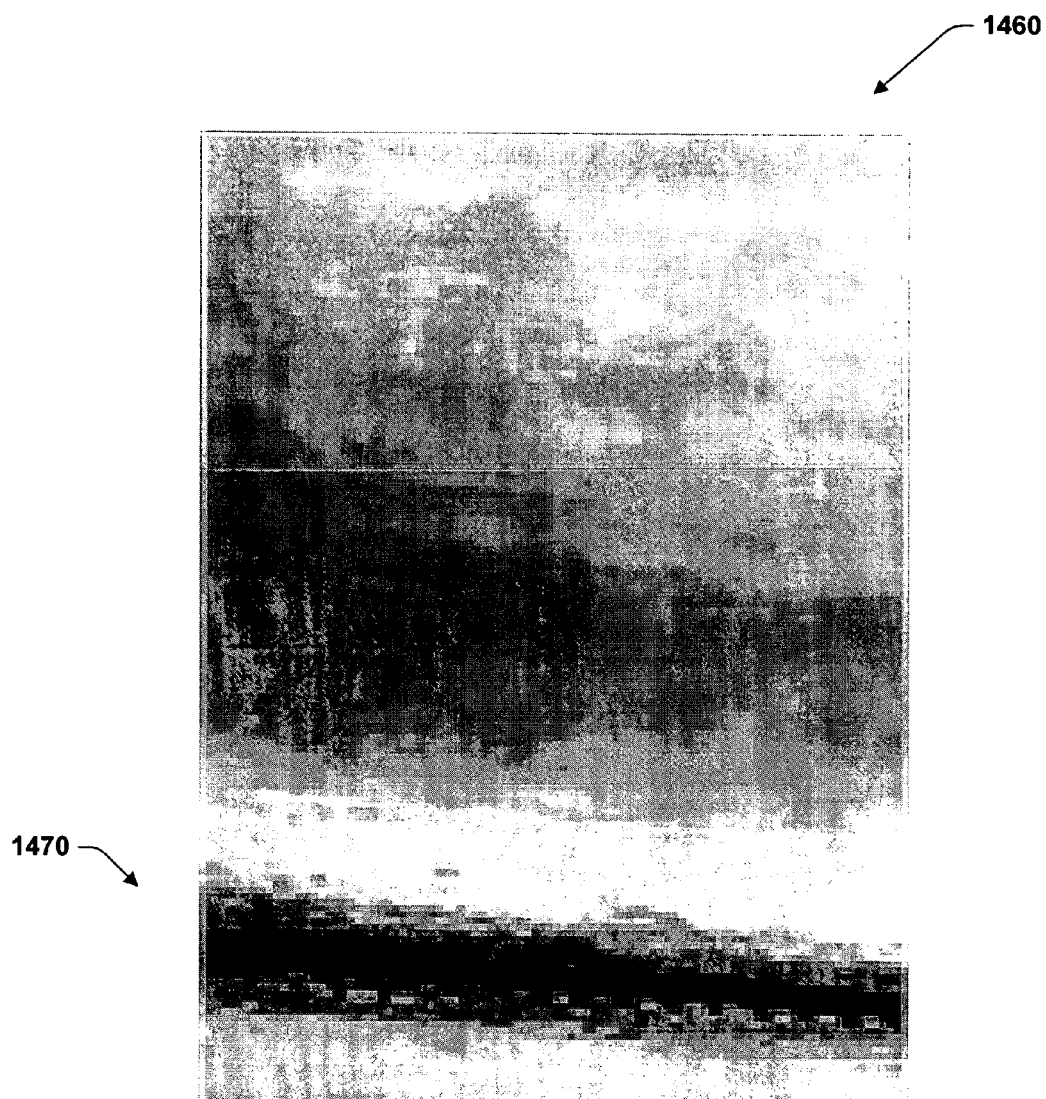
FIG. 14C is an exemplary fringe pattern image in accordance with an aspect of the present invention.

Turning now to FIG. 14C, an exemplary fringe pattern 1460 in accordance with one aspect of the present invention is illustrated. The fringe pattern 1460 comprises a plurality of light intensities or fringes, wherein narrow fringes in close proximity indicate a high degree of localized strain. An area labeled 1470 in the fringe pattern corresponds to an area of higher strain within the photo-elastic material, and thus indicates an area of strain in a rotating shaft. The fringe pattern can be a digital image that can be quickly relayed to the computing system 1012. The system can process the data derived from the image in order to measure torsional strain in the rotating shaft.

The sensitivity of the optical system grows with the number of fringes in the fringe pattern, which depends largely on total distance the beam of light has traveled through the photo-elastic material. More specifically, the number of fringes found in a fringe pattern can be calculated using the following equation:

$$N = \frac{dK(\varepsilon_1 - \varepsilon_2)}{\lambda}$$

where d is the total distance traveled by the light through the photo-elastic material, K is the strain-optical coefficient, $\epsilon_1-\epsilon_2$ is the difference in principal strains, and $\lambda$ is the wavelength of the light. The difference in principal strains is directly proportional to the change in index of refraction. As can be discerned from the above equation, the number of fringes in a fringe pattern grows linearly with distance traveled by the light through the photo-elastic material; thus the sensitivity of the sensor depends in large part on the distance traveled by the light through the photo-elastic material.

Color images can be captured and converted to grey scale images—the grey scale images can be input to a classifier to estimate torque applied to the shaft. Classifiers (e.g., neural networks) are excellent functional estimators and can learn functional mapping from intensity patterns to shaft torque. However, an entire image (1280×960 pixels) can represent more than a million sensor elements. This may be too many data points to directly input into a classifier depending on processing and bandwidth capabilities, and in thus some classifiers may not be able to keep stride with the amount of processing necessary to be done in an allotted time fame. In an effort to reduce the number of inputs to the classifier, optionally a set of cells (which are a subset of the captured data) can be used as inputs to the classifier. For example as shown in FIG. 14D, an analyzed pattern can comprise 15 cells where each cell consists of a square array of 1024 image pixels (32×32). All the pixels in a cell can be summed optically to produce a single input to the classifier corresponding to each cell. All pixels outside the cell boundaries can be ignored. Such technique can be modified and applied in accordance with respective system capabilities. Alternatively, a set of features forming a feature vector can be extracted from the fringe pattern received by the computing element. Efficient processing and interpretation of the feature vector can be performed utilizing pattern recognition and pattern classification algorithms as previously mentioned. FIG. 14E illustrates fringe patterns for varying shaft torques. The pixels in a cell can be summed digitally or optically (e.g., lens array).

FIG. 15 illustrates a method 1500 for measuring torsion strain on a rotating shaft in accordance with one aspect of the present invention. At 1502 linearly polarized light is delivered to a photo-elastic sleeve which encircles a rotating shaft. The light can be emitted by a Light Emitting Diode (LED), a laser diode, incandescent bulb, or through any suitable source. In one instance, the light source emits a broad spectrum white light through a polarizer and into the photo-elastic sleeve. If the polarized light is not directed through the photo-elastic sleeve along the axis of the rotating shaft, at 1504 the light can be re-directed along the axis of the rotating shaft. For example, the light source can be configured to deliver light into the photo-elastic sleeve perpendicularly to the rotating shaft. A reflective notch can be cut into the photo-elastic sleeve in order to redirect the light along the axis of the rotating shaft.

At 1506 the light exiting the photo-elastic sleeve is captured by a capturing component, such as for example a digital camera, or optical detector chip. In one example, a collar edge of the photo-elastic sleeve is coated with a reflective substance, thereby reflecting the light back and requiring the light to pass through the photo-elastic sleeve along the axis of the rotating shaft twice. The light will then exit the photo-elastic sleeve in substantially the same position as it entered the photo-elastic sleeve. Requiring the light to pass through the photo-elastic sleeve twice increases the number of fringes in the resulting fringe pattern, which thereby increases the sensitivity of the optical torque sensor. Since the light travels across a longitudinal portion of the collar that is commensurate with a longitudinal portion of the shaft, significantly more data is gathered regarding the shaft than is made available via prior art systems. In another embodiment, a collar of the photo-elastic sleeve is not coated with a reflective substance, thus allowing the light to exit the photo-elastic sleeve at the uncoated edge. In this instance, a capturing component is placed at the uncoated edge of the photo-elastic sleeve in order to capture the exiting light. The capturing component can be any device capable of capturing the fringe pattern image. The captured fringe pattern can be a color image or a grayscale image.

At 1508 the captured image is relayed to a computing system. The captured image can be relayed via bus, transmission line, wireless transmitter, etc. If the capturing component is a digital component (e.g., a digital camera), the capturing component can send digital data directly to the computing system. Otherwise the computing system can be configured to convert the image of the fringe pattern to digital data. Furthermore, the computing component can be configured to convert a color image to a grayscale image and vice versa. Moreover, analog data can be analyzed as well.

At 1510 the computing system determines torsion strained in the photo-elastic sleeve, and thereby determines and/or infers information relating to strain in the rotating shaft. The computing component can determine the torsional strain, angular strain, lateral strain, or axial strain on the rotating shaft by utilizing an artificial intelligence component. After computing the strain of the rotating shaft the computing system can relay the computed strain to a display component and/or a storage component for displaying and/or storing the computed torsion strain. The computing component can also relay the strain data to a control component that utilizes the real-time strain data to control operation of the rotating shaft. The computing component can also send information to a diagnostic unit to determine health of machine or predict a future machinery failure (e.g., due to metal fatigue). The data image can be relayed from the computing component to the display component and/or storage component via bus, transmission line, wireless transmitter, etc.

Alternatively, at 1512 the computing component determines any malformations in the rotating shaft (e.g., analyze the shaft dynamically to detect joint failure). In one embodiment, the computing component utilizes a neural network to determine the degree of malformation in the rotating shaft such as for example joint/coupling failure or failure of composition material.

Referring now to FIG. 16A, an optical torque sensing system 1600 used in conjunction with a closed-loop control component 1614 in accordance with one aspect of the present invention is illustrated. The control component 1614 of the optical torque sensing system 1600 can include a drive mechanism for driving the rotating shaft such as for example via controlling current to an electric motor. A beam of light is delivered from a light emitting component 1606 into a photo-elastic sleeve 1604 which encircles a rotating shaft 1602. The beam of light is re-directed through the photo-elastic sleeve 1604 along the axis of the rotating shaft 1602 by a reflective notch 1608 cut at an appropriate angle to the light delivered by the light emitting component 1606. The light travels along the axis of the rotating shaft 1602 until reaching the end of the collar of the photo-elastic sleeve 1604. The end of the collar of the photo-elastic sleeve can be coated with a reflective substance (e.g., aluminum filled epoxy), thereby reflecting the light back through the photo-elastic sleeve 1604 towards a capturing component 1610. The capturing component 1610 captures an image of the fringe pattern produced by the light exiting the photo-elastic sleeve 1604. The capturing component relays the fringe pattern image to a computing component 1612, which utilizes an artificial neural network to analyze the data resulting from the image in order to determine the torsion strain of the rotating shaft 1602. The computing component can also determine rotational speed, displacement, acceleration, vibration, temperature, and longitudinal strain. The computing component 1612 can employ artificial intelligence to determine which parameters regarding the rotating shaft to compute and/or relay. Additionally, the computing component can utilize image processing techniques and count fringes to apply Equation 4, and determine the difference in principal strains.

The computing component 1612 can then relay data regarding at least one of the aforementioned measured parameters regarding the rotating shaft 1602 to a control component 1614. The control component 1614 can utilize the at least one parameter to control the operation of the rotating shaft 1602. Possible control changes can be to speed up or slow down to avoid a critical (e.g., resonant) frequency, limit the maximum torque to which the shaft is subject to, immediately proceed to a safe speed, activate actuators to dynamically align the shaft components, or reduce the operating temperature of critical components to limit the stress to composites or bonding agents. Alternatively, the control signal can be a single digital output causing a relay to activate and immediately turning off the system. This method can provide a high degree of safety and prevent a hazardous or unsafe operating condition to continue. This level of protection is virtually impossible to implement utilizing conventional torque sensors or by monitoring motor current and causing a shutdown based on sensing a high current condition. By utilizing a control component 1614 in connection with the optical torque sensing system 1600, the operational life of a rotating shaft 1602 can be extended. Accurate torque control can also enhance critical manufacturing processes requiring precise torque control such as for tissue or film manufacturing. A closed-loop control system allows for more robust and stable control of the operation of the rotating shaft 1602; however, an open-loop control system could also be employed to control the operation of the rotating shaft 1602.

Figure 16B:
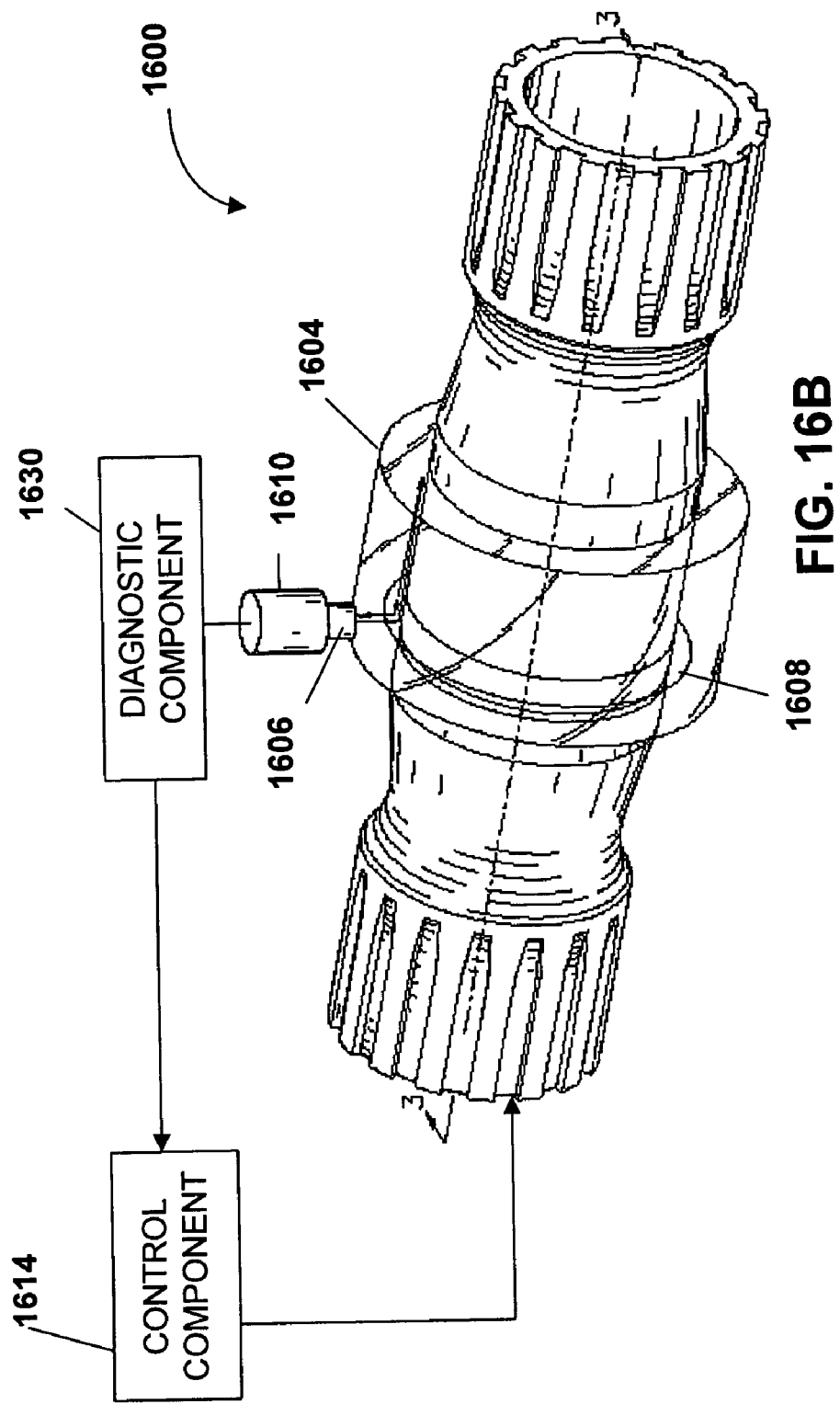

FIG. 16B illustrates another embodiment wherein a diagnostic component 1630 is employed. Likewise, FIG. 16C illustrates an embodiment wherein a diagnostic component is integrated with a control component 1614'.

Figure 17:
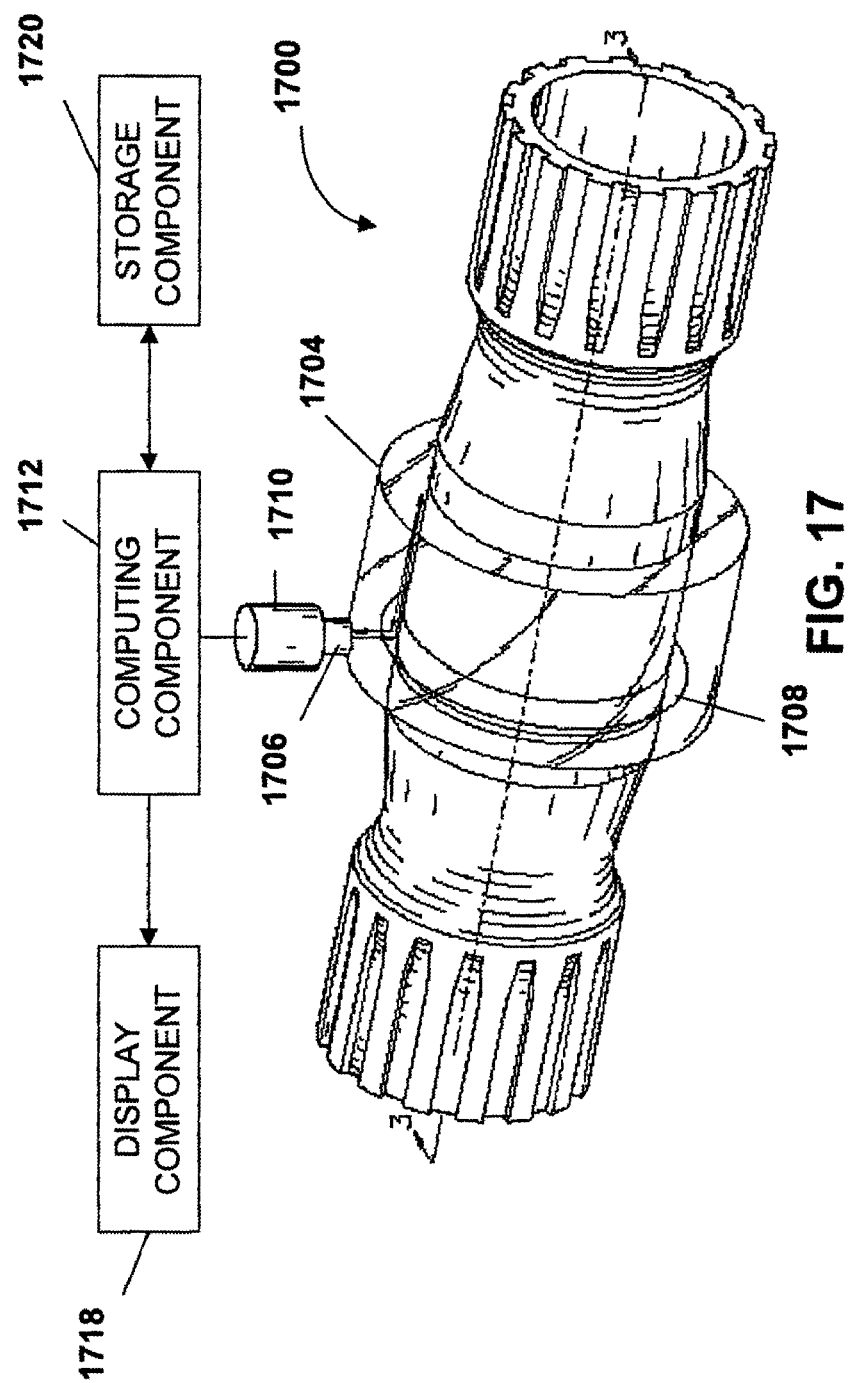
FIG. 17 illustrates an exemplary optical torque sensor used in conjunction with a storage component and/or a display component in accordance with an aspect of the present invention.

Turning to FIG. 17, an optical torque sensor 1700 operating in conjunction with a display component 1718 and a storage component 1720 in accordance with one aspect of the invention is displayed. The optical torque system 1700 operates in substantially the same manner as the optical torque system of FIG. 16A. The computing component 1712 is employed to relay the determined data regarding the rotating shaft 1702 (e.g., torsional strain, longitudinal strain, rotational speed . . . ) to a display component 1718 and/or a storage component 1720 for displaying and/or storing at least one of the parameters sensed by the optical torque sensor 1700.

This display component 1718 can be an electrical device, such as a computer monitor. The data delivered to the display component can then be delivered to an operator numerically, graphically, or by any other means which would allow an operator to determine the value of the data. Alternatively, the display component can be a mechanical device such as a needle employed to direct an operator's eyes to the corresponding measuring unit (much like a car speedometer), or an LED or series of LEDs (e.g., OK, caution, fault . . . ). The storage component can be any device capable of storing data. For example, a tape, ROM, RAM, computer disk, CD, DVD, and a hard drive are all examples of devices that can be employed as a storage component 1720 in conjunction with the optical torque sensing system 1700 of the present invention.

Figure 18:
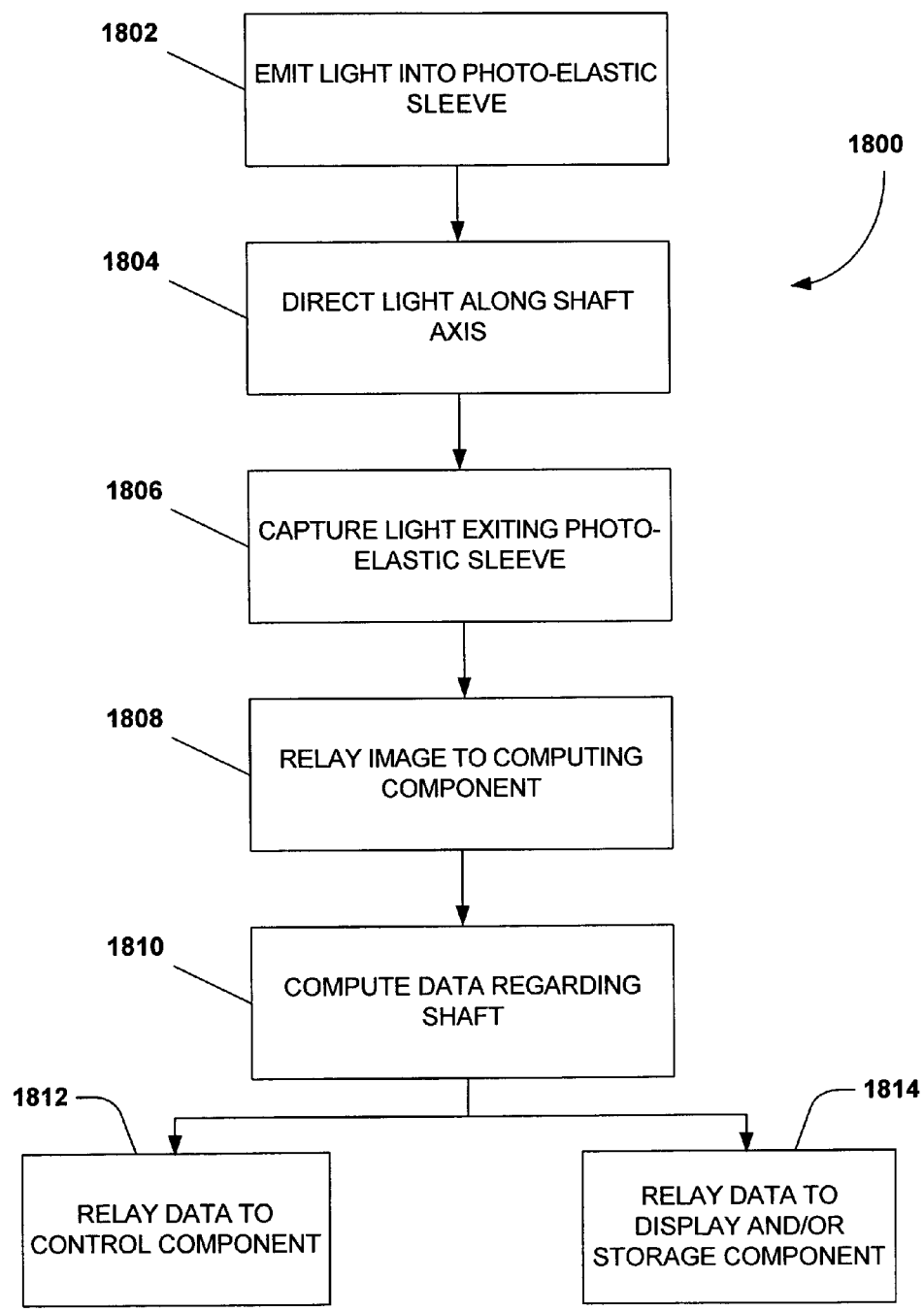
FIG. 18 is a flow diagram of a method that facilitates the control of a rotating shaft utilizing input from an optical torque sensor in accordance with an aspect of the present invention.

Referring to FIG. 18, a method for utilizing an optical torque sensor in conjunction with a control component 1800 in accordance with one aspect of the present invention is displayed. At 1802 polarized light (e.g., linearly, circularly, or elliptically polarized light) is delivered into a photoelastic sleeve that encircles a rotating shaft. If the light delivered by the light source is not directed along the axis of the rotating shaft, at 1804 the light is re-directed along the axis of the rotating shaft.

At 1806, the light exiting the photo-elastic sleeve is captured by a capturing component, such as a digital camera. The collar of the photo-elastic sleeve can be coated with a reflective substance, thereby requiring the light to pass through the photo-elastic sleeve twice prior to exiting the photo-elastic sleeve and reaching the capturing device. Alternatively, the light traveling through the photo-elastic sleeve can be captured by a capturing component after traveling through the photo-elastic sleeve a single time.

At 1808, the images are relayed to a computing component. The images can be relayed through a bus, through transmission lines, via wireless transmitter, etc. The images relayed by the capturing component can be in color or grayscale, and the computing component can convert a color image to a grayscale image and vice versa. If required, the computing component can also convert an analog image relayed from the capturing component into digital data. If the data derived from the images will be used in conjunction with a control component, the images captured by the capturing component can be transferred to the computing component in real-time, thereby allowing for more robust control of the rotating shaft. The capturing component can also capture the images in digital format to facilitate faster processing of the data contained in the image.

At 1810 the computing component can utilize an AI component to analyze the data contained in the images to derive desired parameters regarding the rotating shaft. For example, the computing component can compute torsional strain, longitudinal strain, shaft speed, shaft acceleration, jerk, displacement, vibration, temperature, and dynamic stress of the shaft. An artificial neural network can be employed to manipulate the data contained in the images in order to determine any of the mentioned parameters regarding the rotating shaft. Artificial intelligence techniques can be employed by the computing component to determine which parameters regarding the rotating shaft to compute and/or relay.

At 1812, the computing component relays the data and analysis results to a control component. The data can be relayed through a bus, through transmission lines, via wireless transmitter, etc. The computing component can relay the data to the control component in real time, thus allowing for robust control of the rotating shaft. The control component can utilize an open or closed-loop control system to control the operation of the rotating shaft, thereby increasing the efficiency and operational-life of the rotating shaft. The control component generally controls the operation of a drive mechanism that drives the shaft; thus the rotation of the shaft is controlled. The computing component can also relay data to other components at the same time (e.g., a display component and/or storage component).

Alternatively, at 1814 the resulting data is relayed to a storage component and/or a display component. The data can be relayed through a bus, through transmission lines, via wireless transmitter, etc. The storage component can be any device that can be used to store data (e.g., tape, disk, CD, DVD, ROM, RAM, hard drive . . . ). The display component can be electrical or mechanical, and can be configured to display the data numerically, graphically, etc.

Figure 19:
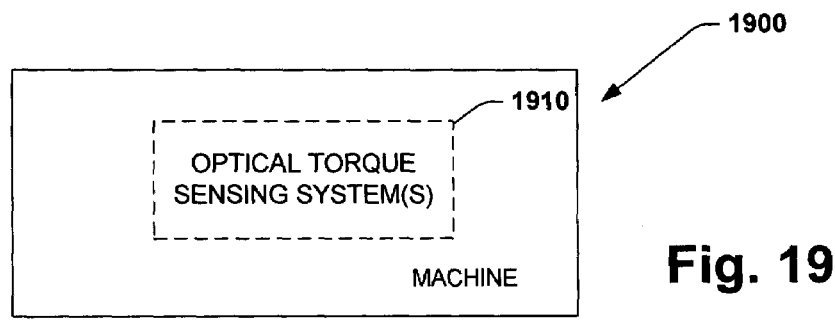
FIG. 19 is a high-level system diagram of a machine employing the subject invention.

FIG. 19 illustrates a high-level system diagram of a machine 1900 employing an optical torque sensing system(s) 1910 in accordance with the subject invention. The machine can employ one or more optical torque sensing systems. For example, a single shaft can have the sensing systems deployed at various locations of the shaft. Also, if the machine 1900 employs more than one shaft, multiple torque sensing system can be employed in connection therewith. It is to be appreciated that multiple torque sensing systems in accordance with the subject invention can communicate with each other or at least a subset thereof in connection with optimizing performance of the machine (e.g., load balancing, output . . . ). For example, for a machine employing a first and second shaft, the optical torque sensing systems for the respective shafts can facilitate regulating usage of the various shafts so as to optimize performance of the machine and/or extend life of the machine as well as shafts. Thus, if the first shaft is exhibiting signs of fatigue/potential failure, the second shaft can be tasked with taking on more load than the first shaft in order to extend life of the first shaft until a convenient time for service.

In addition, time-synchronous processing of the dynamic torque signal from multiple sensors connected to the same component can provide valuable information regarding the dynamic operating characteristics of the instrumented component. For example, dynamic processing of multiple torque signals from a helicopter tail rotor shaft can indicate conditions of torsional oscillation or can indicate the magnitude and direction of torque pulses entering the system. It will be possible to isolate a torque pulse as coming from the main helicopter gearbox or as coming from load disturbances from the tail rotor gearbox or tail rotor blade. The high frequency, temporal resolution necessary to perform this analysis is unavailable with existing commercial torque sensors.

It is to be appreciated that the machine can be of any suitable type (e.g., motor, pump, drive, automobile, boat, ship, helicopter, fixed-wing aircraft, motorcycle, equipment, truck, tank, submarine, surface ship, fan, conveyor, crane, off-road mining or construction vehicle, building component, bridge structure, or mechanical actuator of any type, . . . ) that employs a rotating shaft or load-carrying structural member.

Figure 20:
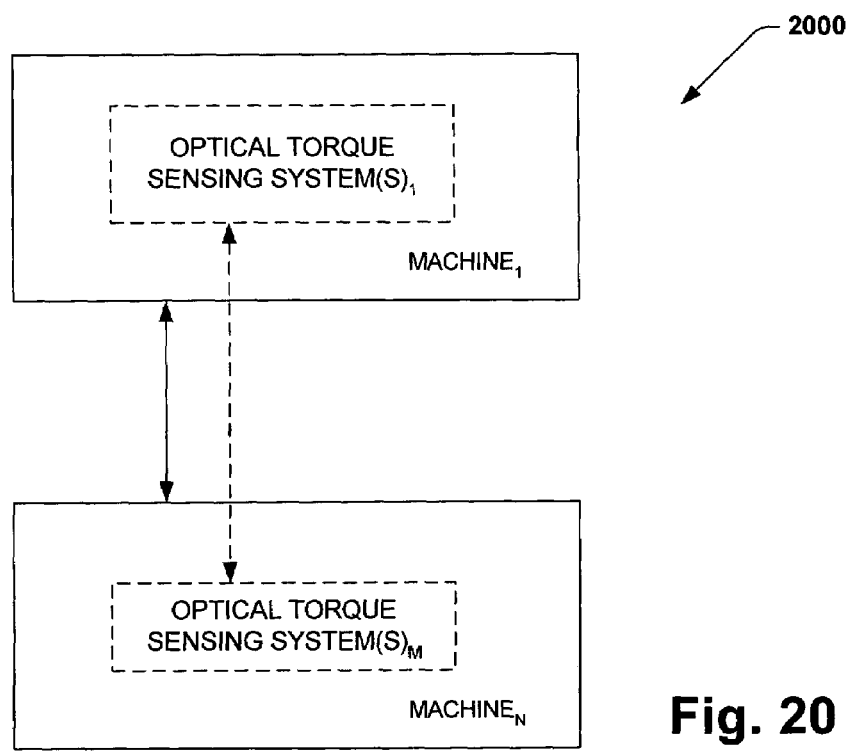
FIG. 20 is a high-level system diagram of a group of machines employing the subject invention.

FIG. 20 illustrates a plurality of "N" machines (N being an integer) that respectively employ M optical torque sensing systems (M also being an integer) in accordance with the subject invention. The machines can be part of a distributed system such that coordination thereof is desired in order to optimize the system. By operatively coupling the machines and the respective sensing systems, performance of the machines with respect to the overall system can be optimized.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical characteristic inspection system comprising:
    a layer of photo-elastic material that overlays a portion of a rotating structure;
    a signal emitting component that delivers a signal to the photo-elastic material, the signal is directed photo-elastic material along an axis of the structure;
    an analysis component that receives light exiting the photo-elastic material, the exiting signal associated with structural degradation characteristics; and
    a control component that provides a pulse of known amplitude to the system.

2. The system of claim 1, the structure is at least one of a shaft, a coupler, and a composite joint.

3. The system of claim 1, the structural degradation characteristics are at least one of fatigue, cracking, breakage, rate of degradation, amount of degradation, and misalignment.

4. The system of claim 1, the signal is at least one of: an optical signal, an electromagnetic signal, a RF signal, and an IR signal.

5. The system of claim 1, further comprising an alignment component, that determines axial and lateral misalignment.

6. The system of claim 1, further comprising a joint integrity verifier, which detects defective composite joints.

7. The system of claim 1, further comprising an early breakage detector, which monitors at least one of fatigue, cracking and early signs of breakage.

8. The system of claim 5, further comprising a correction component, which modifies parameters of the structure, based at least in part on information received from the alignment component.

9. The system of claim 8, wherein the correction component utilizes smart material.

10. The system of claim 9, wherein the smart material is at least one of a Shape Memory Alloy, a piezoelectric ceramic and a electroactive polymer.

11. The system of claim 6, further comprising a correction component, that modifies parameters of the structure, based at least in part on information received from the joint integrity verifier.

12. The system of claim 7, further comprising a correction component, which modifies parameters of the structure, based at least in part on information received from the early breakage detector.

13. The system of claim 1, further comprising an artificial intelligence (AI) component.

14. The system of claim 13, the AI component comprising at least one of: a neural network, an expert system, a support vector machine (SVM), a Bayesian belief network, a data fusion system.

15. The system of claim 1, the photo-elastic material comprising a notch coated with a reflective substance and cut at an angle to direct light along a longitudinal axis of the substrate.

16. The system of claim 1, wherein at least one collar of the photo-elastic material is coated with a reflective substance.

17. The system of claim 16, the light passing along a longitudinal axis of the structure twice, initially transmitted and then reflected.

18. The system of claim 1, the photoelastic material comprising at least one of: a polycarbonate-based compound, a polyester-based compound, a polysulfone-based compound, a polyether sulfone-based compound, a polystyrene-based compound, a polyolefin-based compound, a polyvinyl alcohol-based compound, a cellulose acetate-based compound, a polyvinyl chloride-based compound, a polymethyl methacrylate-based compound, a polyacrylate-based compound, a polyamide-based compound and/or a combination thereof.

19. The system of claim 1, the structure comprising a non-rotating component.

20. The system of claim 19, the non-rotating component comprising at least one of: a bridge structure, an aircraft component, an industrial machine, and a crane.

21. The system of claim 1, the signal emitting component and the analysis component remotely connected to the photo-elastic layer utilizing fiber optical cable.

22. A system that monitors structural characteristics comprising:
   means for directing a light from a light source into a photo-elastic material along an axis of a portion of a structure;
   means for receiving the light exiting the photo-elastic material, the exiting light having at least one of mechanical degradation and alignment characteristics relating to the structure; and
   means for analyzing the characteristics of the structure utilizing the received light,
   means for employing at least one of a Shape Memory Alloy, a piezoelectric ceramic and a electroactive polymer to modify parameters of the structure based at least in part on axial and lateral misalignment data.

23. A method that determines characterstics of a structure comprising:
   injecting a signal into a photo-elastic material along an axis of a portion of a structure;
   receiving a signal exiting the photo-elastic material, the exiting signal having mechanical wear characteristics relating to the structure;
   analyzing the characteristics of the structure utilizing the received signal; and
   employing a smart material to modify parameters of the structure based at least in part on axial and lateral misalignment data.

24. The method of claim 23, wherein the signal comprises a fringe pattern.

25. The method of claim 23, wherein analyzing determines at least one of shaft fatigue, cracking, early signs of breakage; axial misalignment, lateral misalignment, and composite joint failure.

26. The method of claim 25, querying whether correction is needed based on analysis performed on the received signal.

27. The method of claim 26, correcting the characteristic of the structure as determined by the query.

* * * * *